United States Patent
Lim et al.

(10) Patent No.: US 10,414,983 B2
(45) Date of Patent: Sep. 17, 2019

(54) CURVED LIQUID CRYSTAL DISPLAY

(71) Applicant: SAMSUNG DISPLAY CO., LTD., Yongin-si, Gyeonggi-do (KR)

(72) Inventors: Ho Lim, Yongin-si (KR); Suk-Kung Chei, Yongin-si (KR); Min-Joo Han, Yongin-si (KR)

(73) Assignee: Samsung Display Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 15/817,817

(22) Filed: Nov. 20, 2017

(65) Prior Publication Data
US 2018/0362850 A1 Dec. 20, 2018

(30) Foreign Application Priority Data
Jun. 20, 2017 (KR) .................. 10-2017-0077922

(51) Int. Cl.
| | |
|---|---|
| *C09K 19/56* | (2006.01) |
| *G02F 1/1337* | (2006.01) |
| *C09K 19/14* | (2006.01) |
| *C09K 19/34* | (2006.01) |
| C09K 19/04 | (2006.01) |
| C09K 19/12 | (2006.01) |

(52) U.S. Cl.
CPC .............. *C09K 19/56* (2013.01); *C09K 19/14* (2013.01); *C09K 19/3405* (2013.01); *C09K 19/3455* (2013.01); *C09K 19/3486* (2013.01); *C09K 19/3491* (2013.01); *G02F 1/1337* (2013.01); *G02F 1/133711* (2013.01); *C09K 2019/0448* (2013.01); *C09K 2019/122* (2013.01); *C09K 2019/3422* (2013.01); *G02F 2001/133773* (2013.01); *G02F 2001/133776* (2013.01); *G02F 2201/123* (2013.01); *Y10T 428/10* (2015.01); *Y10T 428/1005* (2015.01)

(58) Field of Classification Search
CPC ..... C09K 19/56; G02F 1/1333; G02F 1/1337; G02F 1/133711; G02F 1/133788; G02F 2001/133776; Y10T 428/1005; Y10T 428/10
USPC ............ 428/1.1, 1.2; 349/88, 123, 127, 191
See application file for complete search history.

(56) References Cited

U.S. PATENT DOCUMENTS

2016/0032190 A1* 2/2016 Lim ..................... C09K 19/56 349/123
2017/0045783 A1 2/2017 Lim

FOREIGN PATENT DOCUMENTS

| KR | 10-2016-0110668 A | 9/2016 |
| KR | 10-2017-0010242 A | 1/2017 |

* cited by examiner

*Primary Examiner* — Ruiyun Zhang
(74) *Attorney, Agent, or Firm* — Lee & Morse, P.C.

(57) ABSTRACT

A curved liquid crystal display includes a first substrate, a second substrate overlapping the first substrate, a liquid crystal layer positioned between the first substrate and the second substrate and including a plurality of liquid crystal molecules, and a lower protrusion positioned between the first substrate and the liquid crystal layer, the lower protrusion being formed from at least one among a first compound represented by Chemical Formula 1, a polymer obtained from the first compound, and a polymer of the first compound and a cross-linker.

11 Claims, 14 Drawing Sheets

CURVED LIQUID CRYSTAL DISPLAY

CROSS-REFERENCE TO RELATED APPLICATION

Korean Patent Application No. 10-2017-0077922 filed on Jun. 20, 2017, in the Korean Intellectual Property Office, and entitled: "Curved Liquid Crystal Display," is incorporated by reference herein in its entirety.

BACKGROUND

1. Field

Embodiments relate to a curved liquid crystal display.

2. Description of the Related Art

A liquid crystal display may include two display panels each including a field generating electrode such as a pixel electrode and a common electrode, and a liquid crystal layer interposed therebetween. The liquid crystal display may generate an electric field in the liquid crystal layer by applying a voltage to the field generating electrodes to determine a direction of liquid crystal molecules of the liquid crystal layer and displaying an image by controlling polarization of incident light.

The above information disclosed in this Background section is only for enhancement of understanding of the background of the invention and therefore it may contain information that does not form the prior art that is already known in this country to a person of ordinary skill in the art.

SUMMARY

Embodiments are directed to a curved liquid crystal display, including a first substrate, a second substrate overlapping the first substrate, a liquid crystal layer positioned between the first substrate and the second substrate and including a plurality of liquid crystal molecules, and a lower protrusion positioned between the first substrate and the liquid crystal layer, the lower protrusion being formed from at least one among a first compound represented by Chemical Formula 1, a polymer obtained from the first compound, and a polymer of the first compound and a cross-linker, P—$R^1$-[$A^3$-$Z^3$]$_m$-[$A^2$]$_k$-[$Z^2$]$_n$-$A^1$-[$Z^1$]$_{m2}$—$R_a$ [Chemical Formula 1]

In Chemical Formula 1, $A^1$, $A^2$, and $A^3$ may independently include any one among a heterocyclic group including a substituted or unsubstituted aromatic ring, a heteroaromatic ring, an aliphatic ring, and a condensation ring, or —$Z^4$—$S_p$—$Z^5$—P or L, L may include at least one among H, F, Cl, Br, I, —CN, —NO, —NCO, —NCS, —OCN, —SCN, —C(=O)N($R^0$)$_2$, —C(=O)$R^0$, a silyl group or a cycloalkyl group with a carbon number of 3 to 20, an alkoxy group, an alkylcarbonyl group, and an alkylcarbonyloxy group with a carbon number of 1 to 25, P may independently include a polymerizable group, $S_p$ may independently be a spacer group or a single bond, $Z^1$, $Z^4$, and $Z^5$ may independently include at least one among —O—, —S—, —CO—, —CO—O—, —OCO—, —O—CO—O—, —OCH$_2$—, —SCH$_2$—, —CH$_2$S—, —CF$_2$O—, —OCF$_2$—, —CF$_2$S—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(C$R^0$, $R^{00}$)$_{n1}$—, —CH(—$S_p$—P)—, —CH$_2$CH—(—$S_p$—P)— and —(CH(—$S_p$—P)CH(—$S_p$—P)—, and —O—(CH$_2$)—OCO—(CH$_2$)$_n$—, $Z^2$ may include at least one among —O—, —S—, —CO—, —CO—O—, —OCO—, —O—CO—O—, —OCH$_2$—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(C$R^0$,$R^{00}$)$_{n1}$—, —CH(—$S_p$—P)—, —CH$_2$CH—(—$S_p$—P)—, —(CH(—$S_p$—P)CH(—$S_p$—P)—, $Z^3$ may include at least one among —O—, —S—, —CO—, —CO—O—, —OCO—, —O—CO—O—, —OCH$_2$—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(C$R^0$)$R^{00}$)$_{n1}$—, —CH(—$S_p$—P)—, —CH$_2$CH—(—$S_p$—P)—, and —(CH(—$S_p$—P)CH(—$S_p$—P)—, $n_1$ in $Z_1$ to $Z_3$ may be 1, 2, 3, or 4, n may be 0 or 1, m may be 0, 1, 2, 3, 4, 5, or 6, $m_2$ may be 0, 1, 2, 3, 4, 5, or 6, k may be 0 or 1, $R^0$ may be a C1 to C12 alkyl group, $R^{00}$ may be H or a C1 to C12 alkyl group, $R^1$ may be any one among a hydrogen element, a halogen element, a linear bond, a C1 to C25 branched alkyl group, and a cyclic alkyl group, Ra may be an unsubstituted heterocyclic ring or

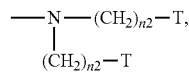

in which $n_2$ is a integer of 1 to 12, and T includes at least one among —OH, —CH$_3$, —CF$_3$, —CHF$_2$, —CH$_2$F, —CH$_2$Br, —CHBr$_2$, —CHCl$_2$, and —CH$_2$Cl, provided that at least one T includes —OH.

In the first compound represented by Chemical Formula 1, Ra may be an anchoring group, P may be an immobilizing group, and a vertical alignment group may be disposed between the Ra and the P, and the anchoring group may be positioned adjacent to the first substrate.

Chemical Formula 1 may be represented by Chemical Formula 1A:

P-E-F-G-Ra [Chemical Formula 1A]

In Chemical Formula 1A,

P may be

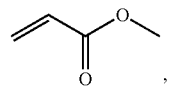

E may be —(CH$_2$)$_n$—O— in which n is a integer of 1 to 12,

F may be at least one selected from a group including

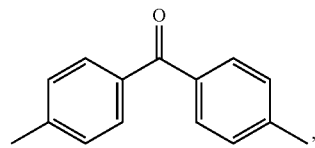

-continued
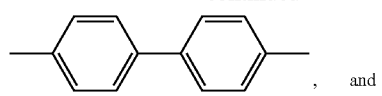, and
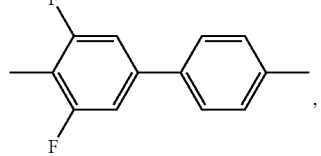,
G may be at least one selected from a group including
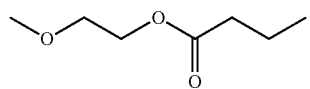,
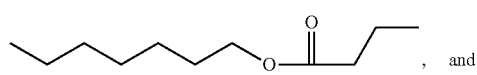, and
-continued
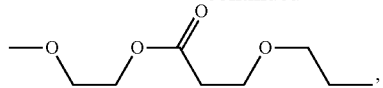,
and
Ra may be at least one selected from a group including
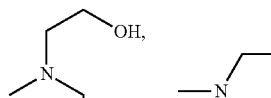, , 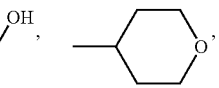,
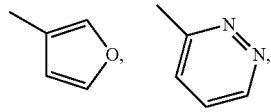, , and 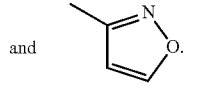.
The first compound may include at least one among compounds represented by Chemical Formulae 1-1 to 1-10:
[Chemical Formula 1-1]
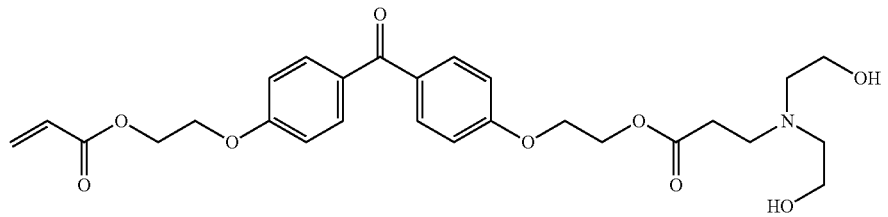
[Chemical Formula 1-2]
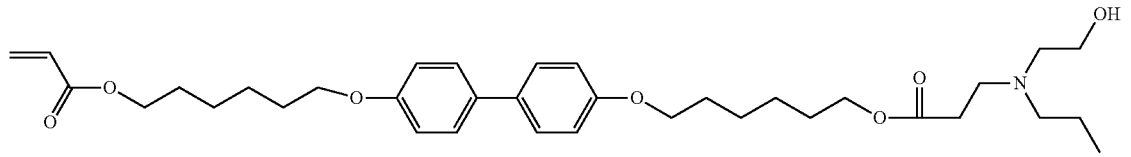
[Chemical Formula 1-3]
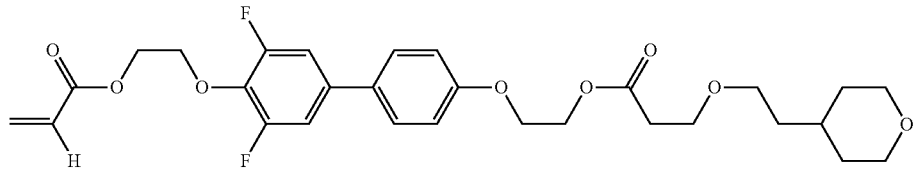
[Chemical Formula 1-4]
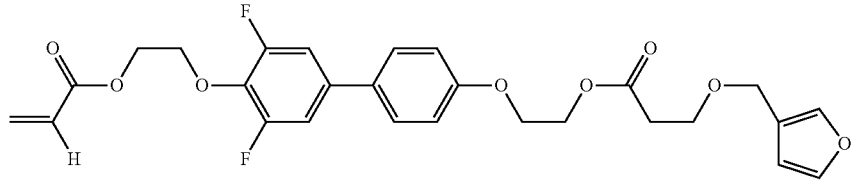
[Chemical Formula 1-5]
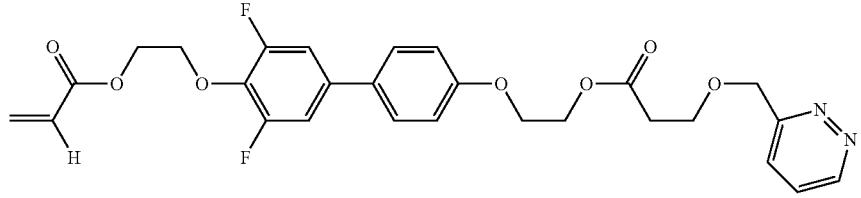

[Chemical Formula 1-6]
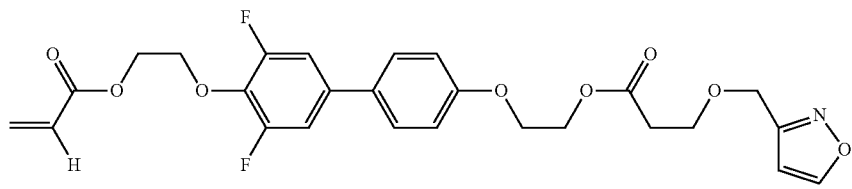
[Chemical Formula 1-7]
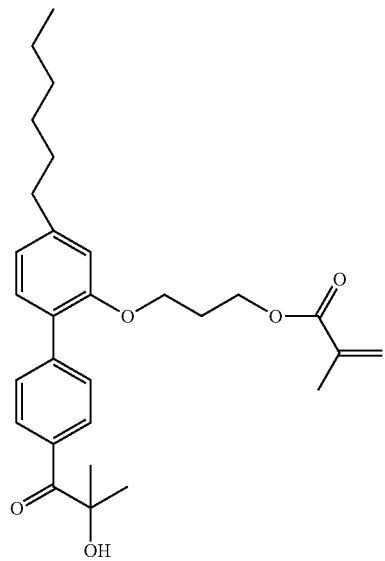
[Chemical Formula 1-8]
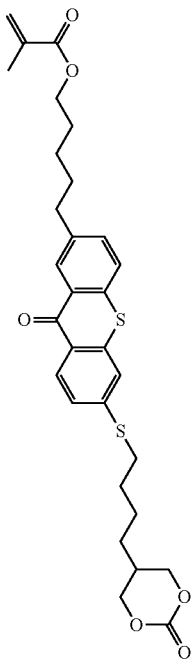
[Chemical Formula 1-9]
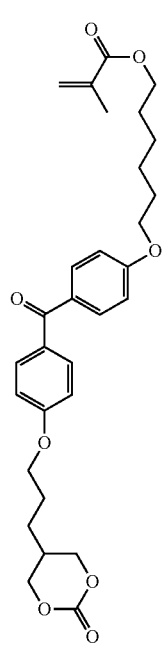
[Chemical Formula 1-10]
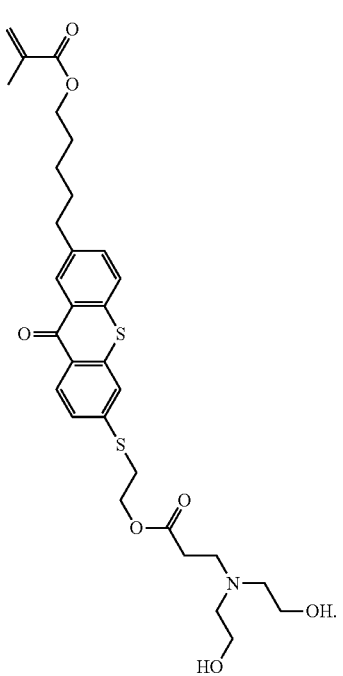

The lower protrusion may include the polymer obtained from the first compound.
The cross-linker may include at least one among second compounds represented by Chemical Formulae 2-1 to 2-12:
[Chemical Formula 2-1]
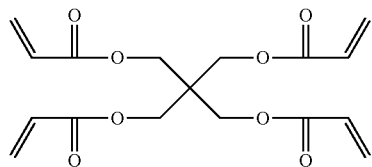
[Chemical Formula 2-2]
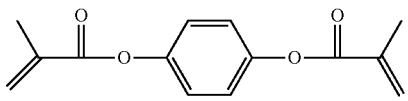
[Chemical Formula 2-3]
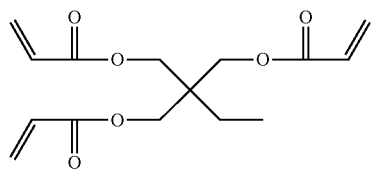
[Chemical Formula 2-4]
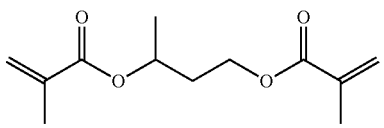
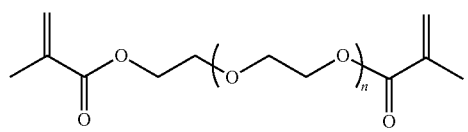
[Chemical Formula 2-5]
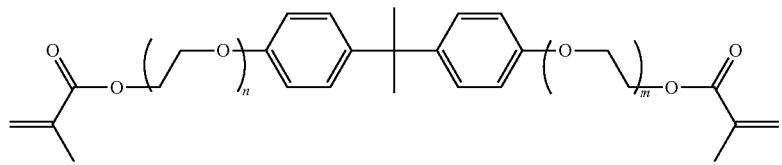
[Chemical Formula 2-6]
[Chemical Formula 2-7]
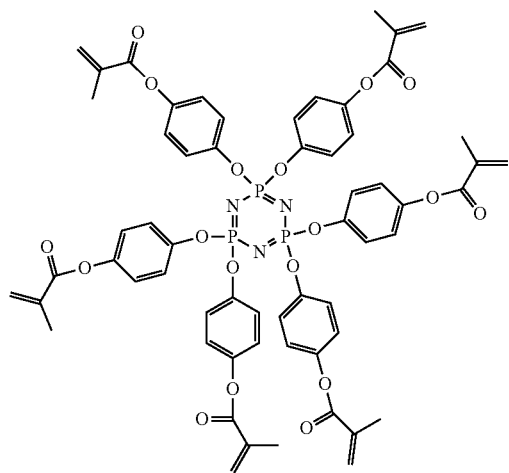
[Chemical Formula 2-8]
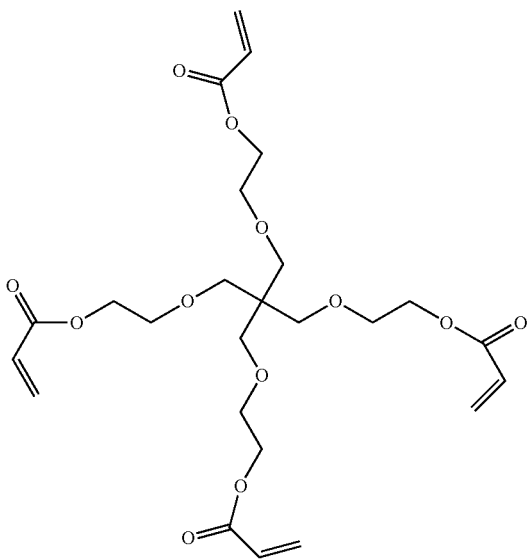

[Chemical Formula 2-9]

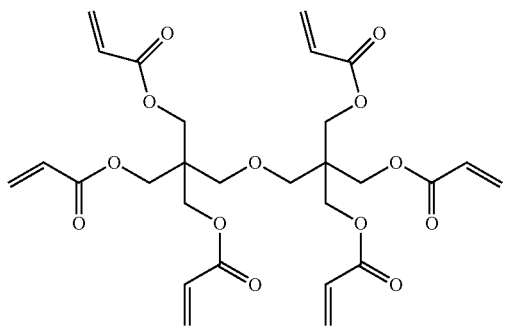

[Chemical Formula 2-10]

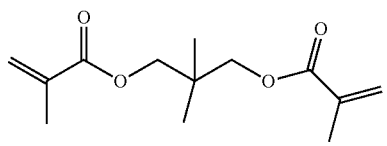

[Chemical Formula 2-11]

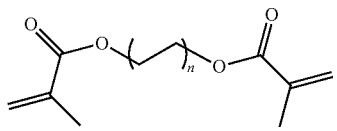

[Chemical Formula 2-12]

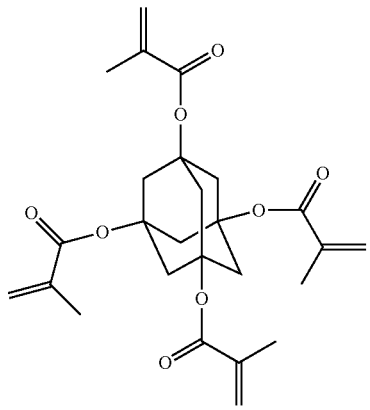

In Chemical Formulae 2-5, 2-6, and 2-11, n and m may independently be integers of 1 to 12.

The curved liquid crystal display may further include an upper protrusion positioned between the second substrate and the liquid crystal layer, the upper protrusion being formed from the first compound represented by Chemical Formula 1.

A number of the lower protrusions may be larger than a number of the upper protrusions.

The curved liquid crystal display may further include pixel electrode positioned between the first substrate and the liquid crystal layer, and an upper alignment layer positioned between the second substrate and the liquid crystal layer. An adsorption force of the first compound for the upper alignment layer may be smaller than an adsorption force of the first compound for the pixel electrode.

The curved liquid crystal display may further include pixel electrode positioned between the first substrate and the liquid crystal layer, and a lower alignment layer positioned between the pixel electrode and the liquid crystal layer. The lower alignment layer may further include an initiator, and the initiator may be bonded with the first compound.

The liquid crystal layer may not include a reactive mesogen.

Liquid crystal molecules adjacent to the first substrate may be inclined with respect to a direction perpendicular to a plane of the first substrate, and liquid crystal molecules adjacent to the second substrate may be perpendicular to a plane of the second substrate.

Embodiments are also directed to a curved liquid crystal display, including a first substrate, a second substrate overlapping the first substrate, a liquid crystal layer positioned between the first substrate and the second substrate and including a plurality of liquid crystal molecules, and at least one of a lower protrusion positioned between the first substrate and the liquid crystal layer and an upper protrusion positioned between the second substrate and the liquid crystal layer, the lower protrusion including a polymer of a first compound and a cross-linker. The first compound may include an anchoring group, a vertical alignment group, and an immobilizing group, and the cross-linker may include at least one among second compounds represented by Chemical Formulae 2-1 to 2-12:

[Chemical Formula 2-1]

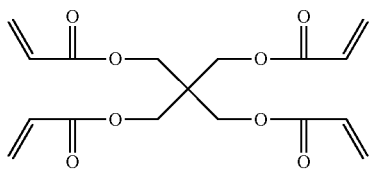

[Chemical Formula 2-2]

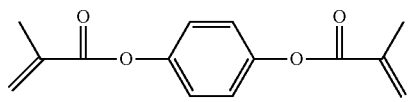

[Chemical Formula 2-3]
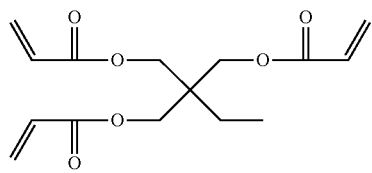
[Chemical Formula 2-4]
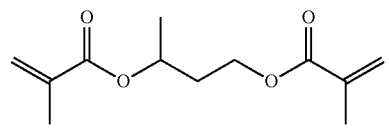
[Chemical Formula 2-5]
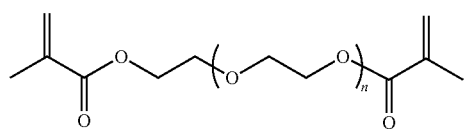
[Chemical Formula 2-6]
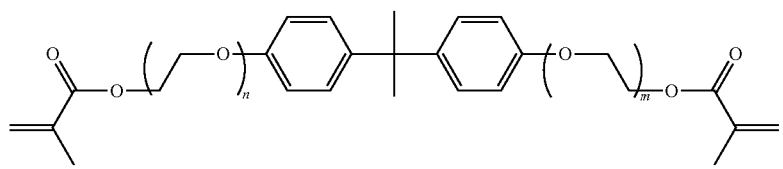
[Chemical Formula 2-7]
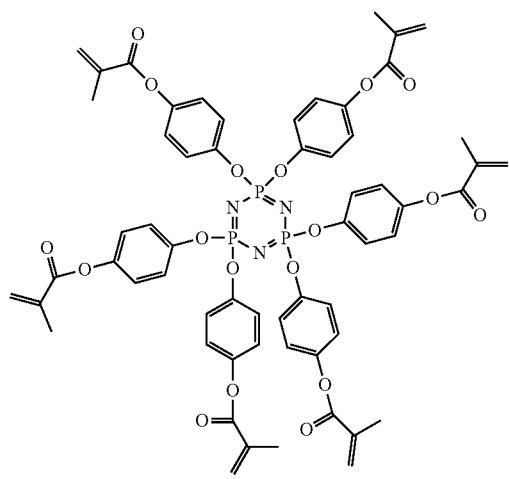
[Chemical Formula 2-8]
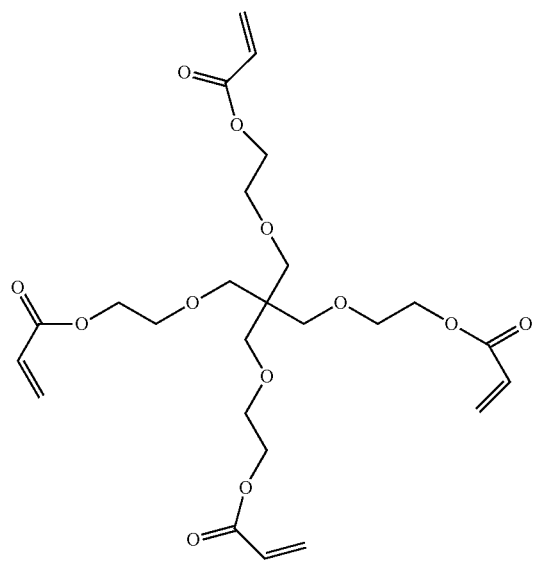
[Chemical Formula 2-9]
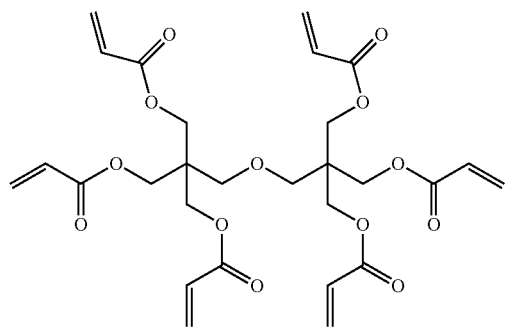
[Chemical Formula 2-10]
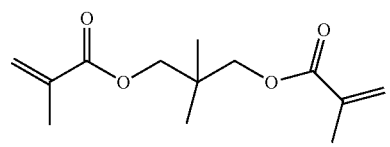

[Chemical Formula 2-11]

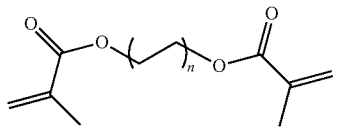

[Chemical Formula 2-12]

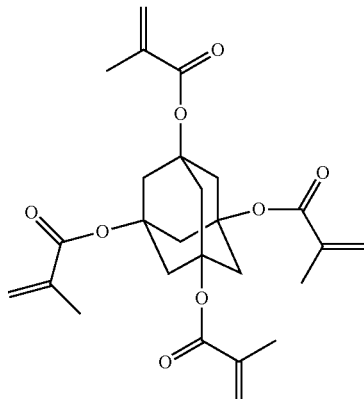

In Chemical Formulae 2-5, 2-6, and 2-11, n and m may independently be integers of 1 to 12.

The liquid crystal layer may not include a reactive mesogen.

Liquid crystal molecules adjacent to the first substrate may be inclined with respect to a direction perpendicular to a plane of the first substrate, and liquid crystal molecules adjacent to the second substrate may be perpendicular to the plane of the second substrate.

The liquid crystal display may include a plurality of the lower protrusions and a plurality of the upper protrusions, a number of the lower protrusions being larger than a number of the upper protrusions.

The curved liquid crystal display may further include a pixel electrode positioned between the first substrate and the liquid crystal layer, and an upper alignment layer positioned between the second substrate and the liquid crystal layer. An adsorption force of the first compound for the upper alignment layer may be smaller than an adsorption force of the first compound for the pixel electrode.

The curved liquid crystal display may further include a pixel electrode positioned between the first substrate and the liquid crystal layer, and a lower alignment layer positioned between the pixel electrode and the liquid crystal layer. The lower alignment layer may further include an initiator, and the initiator may be bonded with the first compound.

The lower protrusion may further include a polymer obtained from the first compound.

Liquid crystal molecules adjacent to the second substrate may be arranged perpendicular to the plane of the second substrate by the vertical alignment group of the first compound.

BRIEF DESCRIPTION OF THE DRAWINGS

Features will become apparent to those of skill in the art by describing in detail example embodiments with reference to the attached drawings in which.

DETAILED DESCRIPTION

Figure 1:
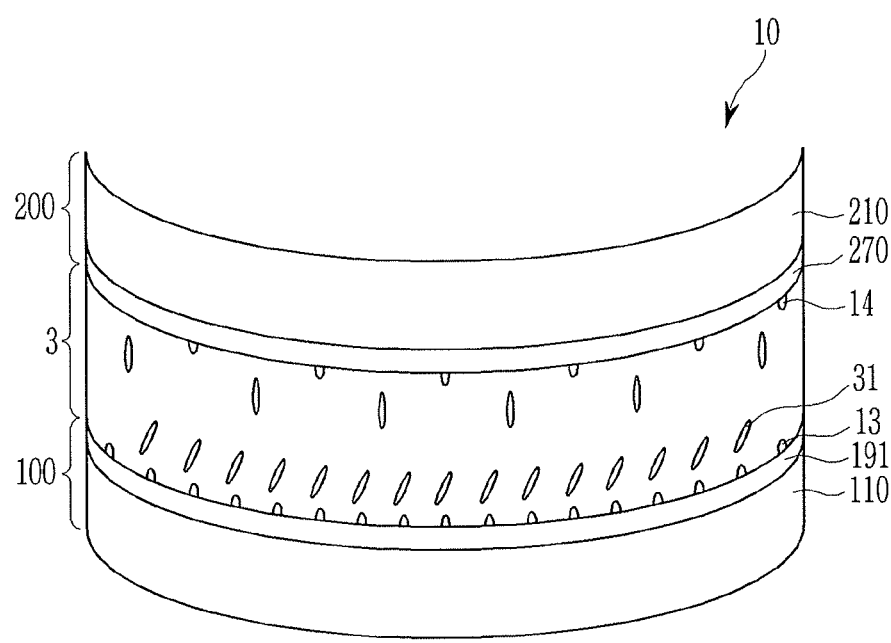
FIG. 1 illustrates a cross-sectional view of partial constituent elements of a curved liquid crystal display according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

In order to clearly explain the present invention, portions that are not directly related to the present invention may be omitted.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Throughout the specification, the phrase "on a plane" means viewing the object portion from the top, and the phrase "on a cross-section" means viewing a cross-section of which the object portion is vertically cut from the side.

In the alkyl group with a carbon number of 1 to 20, "substituted" means that at least one hydrogen atom is substituted with a substituent selected from a set consisting of halogen atoms (F, Cl, Br, and I), a hydroxy group, a C1 to C20 alkoxy group, a nitro group, a cyano group, an amino group, an imino group, an azido group, an amidino group, a hydrazino group, a hydrazone group, a carbonyl group, a carbamoyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C30 heteroaryl group, or a combination thereof.

Further, in this specification, the prefix "hetero" indicates that at least one heteroelement selected from a group consisting of at least one of N, O, S, and P are contained in one ring, unless otherwise stated.

Also, in this specification, unless otherwise stated, the word "alicyclic" indicates a C3 to C40 cycloalkyl, a C3 to C40 cycloalkenyl, a C3 to C40 cycloalkynyl, a C3 to C40 cycloalkylene, a C3 to C40 cycloalkenylene, or a C3 to C40 cycloalkynylene. For example, this indicates a C3 to C20 cycloalkyl, a C3 to C20 cycloalkenyl, a C3 to C20 cycloalkynyl, a C3 to C20 cycloalkylene, a C3 to C20 cycloalkenylene, or a C3 to C20 cycloalkynylene. The word "aromatic" indicates a C6 to C40 aryl, a C2 to C40 heteroaryl, a C6 to C40 arylene, or a C2 to C40 heteroarylene. For example, this indicates a C6 to C16 aryl, a C2 to C16 heteroaryl, a C6 to C16 arylene, or a C2 to C16 heteroarylene.

In addition, unless otherwise stated, the term "combination" indicates a mixture or a copolymerization, and for example indicates two or more rings being formed as a fused ring, or two or more rings being connected to each other by a single bond or a functional group such as —O—, —S—, —C(=O)—, —CH(OH)—, —S(=O)—, —S(=O)$_2$—, —Si(CH$_3$)$_2$—, —(CH$_2$)$_p$— (herein, 1=p=2), —(CF$_2$)$_q$— (herein, 1=q=2), —C(CH$_3$)$_2$—, —C(CF$_3$)$_2$—, —C(CH)$_3$ (CF$_3$)—, or —C(=O)NH—, in an alicyclic organic group and an aromatic organic group.

Now, a curved liquid crystal display will be described in detail with reference to FIG. 1 and FIGS. 2A and 2B.

Figure 2:
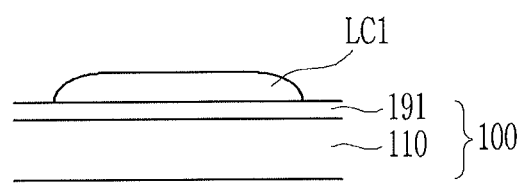
FIGS. 2A and 2B illustrate cross-sectional views for a manufacturing method of a curved liquid crystal display according to an example embodiment of FIG. 1.
Figure 2:
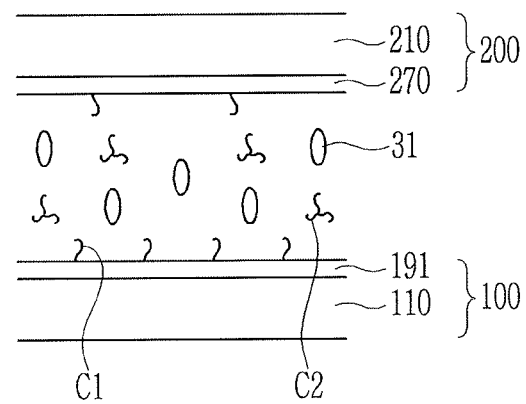

FIG. 1 is a cross-sectional view of partial constituent elements of a curved liquid crystal display according to an example embodiment, and FIGS. 2A and 2B are cross-sectional views of stages in a manufacturing method of a curved liquid crystal display according to an example embodiment of FIG. 1.

Referring to FIG. 1, a liquid crystal display 10 according to an example embodiment may be a curved type. The liquid crystal display 10 may be curved in a horizontal direction of a long axis or may be curved in a vertical direction of a short axis. The present embodiment describes a curved liquid crystal display 10 curved along the horizontal direction. However embodiments are not limited thereto, and it may also be applied to a curved liquid crystal display curved along the vertical direction or a flat display.

The liquid crystal display 10 according to the present example embodiment includes a lower panel 100, an upper panel 200 overlapping the lower panel 100, and a liquid crystal layer 3 positioned between the lower panel 100 and the upper panel 200.

The lower panel 100 includes a pixel electrode 191 positioned between a first substrate 110 and the liquid crystal layer 3. The upper panel 200 includes a common electrode 270 positioned between a second substrate 210 and the liquid crystal layer 3. The lower panel 100 and the upper panel 200 may further include constituent elements such as signal lines, and a thin film transistor positioned between the first substrate 110 and the pixel electrode 191, as described in detail in FIG. 7 and FIG. 8 below.

A plurality of lower protrusions 13 may be positioned between the pixel electrode 191 and the liquid crystal layer 3. A liquid crystal molecule 31 positioned adjacent to the lower protrusion 13 may have a pre-tilt. The pre-tilt represents being inclined with respect to a direction perpendicular to the first substrate 110.

Also, a plurality of upper protrusions 14 may be positioned between the common electrode 270 and the liquid crystal layer 3. A liquid crystal molecule 31 adjacent to the upper protrusion 14 may be perpendicular to the second substrate 210, for example, without pre-tilt.

In the liquid crystal display 10 according to the present example embodiment, although an additional alignment layer is not included, the liquid crystal molecule 31 adjacent to the lower panel 100 may have the pre-tilt and the liquid crystal molecule 31 adjacent to the upper panel 200 may be vertically aligned.

As the lower panel 100 and the upper panel 200 are curved for providing the curved liquid crystal display 10, a distortion problem of the alignment of the lower panel 100 and the upper panel 200 may occur. If the liquid crystal molecules 31 adjacent to the first substrate 110 and the second substrate 210 all have the pre-tilt, the pre-tilt direction of the liquid crystal molecule 31 adjacent to the lower panel 100 and the liquid crystal molecule 31 adjacent to the upper panel 200 may be differentiated by misalignment between the display panels. Accordingly, a texture may occur in the display device.

In the liquid crystal display 10 according to an example embodiment, even if the misalignment is generated between the lower panel 100 and the upper panel 200, a pre-tilt direction deviation between the liquid crystal molecules 31 may not be induced because of the upper panel 200 without the pre-tilt. Accordingly, the curved liquid crystal display 10 according to an example embodiment may control the transmittance reduction while preventing a texture generation due to the deviation of the liquid crystal molecule 31.

The lower protrusion 13 positioned between the pixel electrode 191 and the liquid crystal layer 3 and the upper protrusion 14 positioned between the common electrode 270 and the liquid crystal layer 3 will now be described in detail.

The lower protrusion 13 may include or be formed using at least one among a first compound represented by Chemical Formula 1 below, a polymer obtained from the first compound, and the polymer of the first compound and a cross-linker.

P—R$^1$-[A$^3$-Z$^3$]$_m$-[A$^2$]$_k$-[Z$^2$]$_n$-A$^1$-[Z$^1$]$_{m2}$-R$_a$    [Chemical Formula 1]

Herein, A$^1$, A$^2$, and A$^3$ include any one among a heterocyclic group including a substituted or unsubstituted aromatic ring, a heteroaromatic ring, an aliphatic ring, and a condensation ring, or —Z$^4$—S$_p$—Z$^5$—P or L, L includes at least one among H, F, Cl, Br, I, —CN, —NO, —NCO, —NCS, —OCN, —SCN, —C(=O)N(R$^0$)$_2$, —C(=O)R$^0$, a silyl group, or a cycloalkyl group with a carbon number of 3 to 20, an alkoxy group, an alkylcarbonyl group, and an alkylcarbonyloxy group with a carbon number of 1 to 25, P includes a polymerizable group, S, is a spacer group or a single bond, $Z^1$, $Z^4$, and $Z^5$ include at least one among —O—, —S—, —CO—, —CO—O—, —O—CO—O—, —OCH$_2$—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$, R$^{00}$)$_{n1}$—, —CH(—S$_p$—P)—, —CH$_2$CH—(—S$_p$—P)— and —(CH(—S$_p$—P)CH(—S$_p$—P)—, —O—(CH$_2$)—OCO—(CH$_2$)$_n$—, $Z^2$ includes at least one among —O—, —S—, —CO—, —CO—O—, —OCO—, —O—CO—O—, —OCH$_2$—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$,R$^{00}$)$_{n1}$—, —CH(—S$_p$—P)—, —CH$_2$CH—(—S$_p$—P)—, —(CH(—S$_p$—P)CH (—S$_p$—P)—, $Z^3$ includes at least one among —O—, —S—, —CO—, —CO—O—, —OCO—, —O—CO—O—, —OCH$_2$—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$)R$^{00}$)$_{n1}$—, —CH(—S$_p$—P)—, —CH$_2$CH—(—S$_p$—P)— and —(CH(—S$_p$—P)CH(—S$_p$—P)—, $n_1$ in $Z_1$ to $Z_3$ is 1, 2, 3, or 4, n is 0 or 1, m is 0, 1, 2, 3, 4, 5, or 6, $m_2$ is 0, 1, 2, 3, 4, 5, or 6, k is 0 or 1, R is a C1 to C12 alkyl group, $R^{00}$ is H or a C1 to C12 alkyl group, $R^1$ is any one among a hydrogen element, a halogen element, a linear bond, a C1 to C25 branched alkyl group, and a cyclic alkyl group, Ra is an unsubstituted heterocyclic ring or

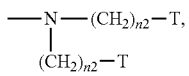

$n_2$ in Ra is a integer of 1 to 12, T includes at least one among —OH, —CH$_3$, —CF$_3$, —CHF$_2$, —CH$_2$F, —CH$_2$Br, —CHBr$_2$, —CHCl$_2$, and —CH$_2$Cl, and at least one T includes —OH. The unsubstituted heterocyclic ring may be substituted by the chemical formula below.

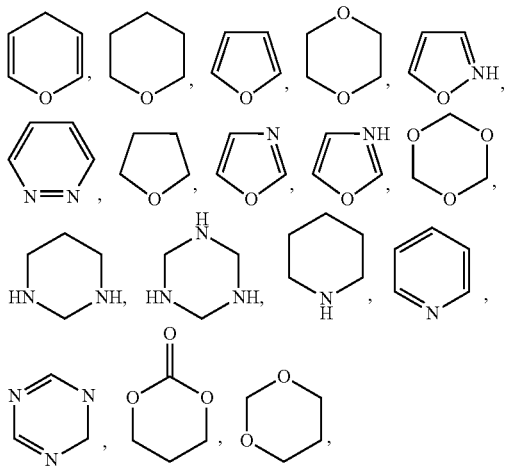

Also, Chemical Formula 1 may include Chemical Formula 1A below.

P-E-F-G-Ra　　　　　[Chemical Formula 1A]

Herein, P is

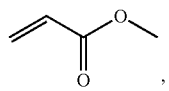

Ra is at least one selected from a group including

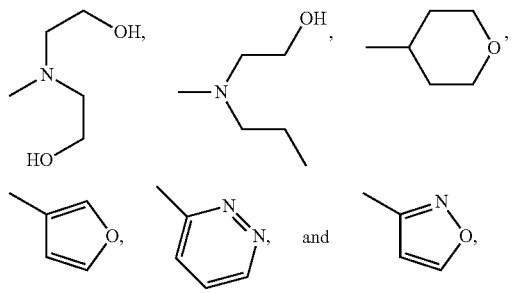

E is —(CH$_2$)$_n$—O—, and F is at least one selected from a group including

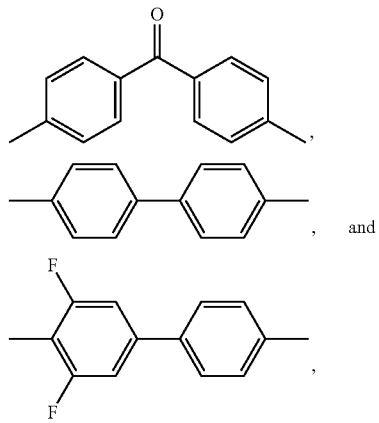

G is at least one selected from a group including

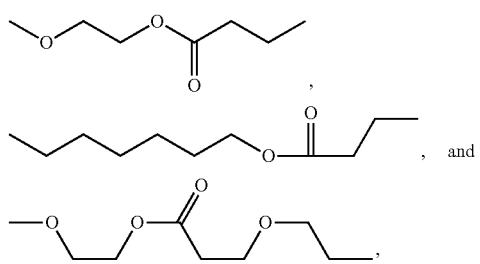

and n in E is a integer of 1 to 12.

The first compound represented by Chemical Formula 1 may include the first compound represented by Chemical Formulae 1-1 to 1-10, but it is not limited thereto.

[Chemical Formula 1-1]
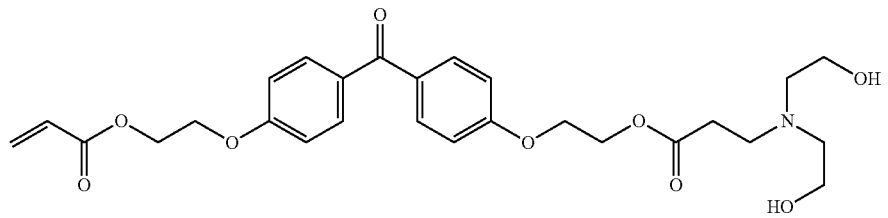
[Chemical Formula 1-2]
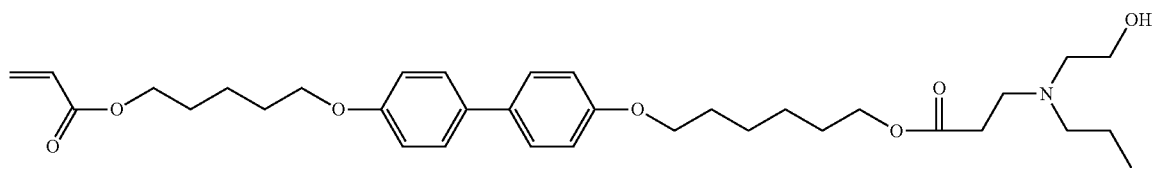
[Chemical Formula 1-3]
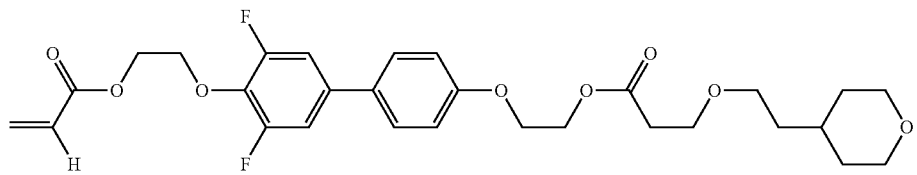
[Chemical Formula 1-4]
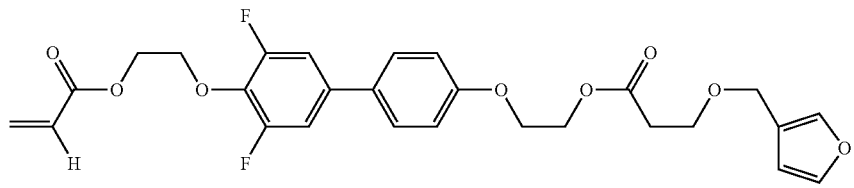
[Chemical Formula 1-5]
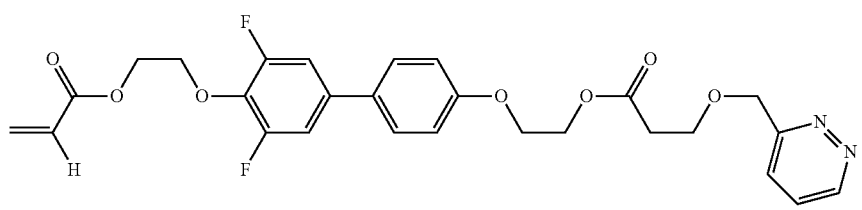
[Chemical Formula 1-6]
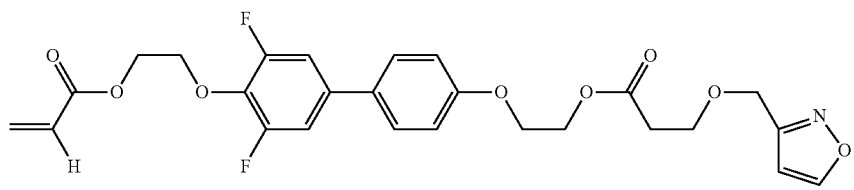

[Chemical Formula 1-7]
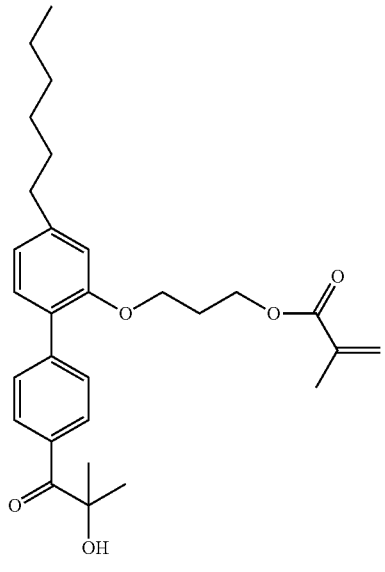
[Chemical Formula 1-8]
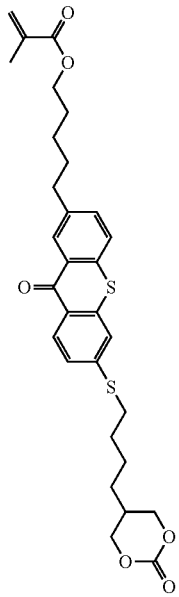
[Chemical Formula 1-9]
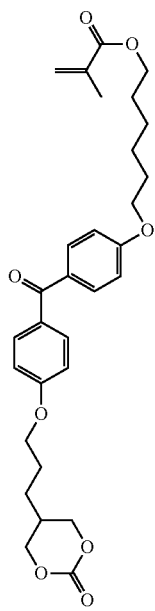
[Chemical Formula 1-10]
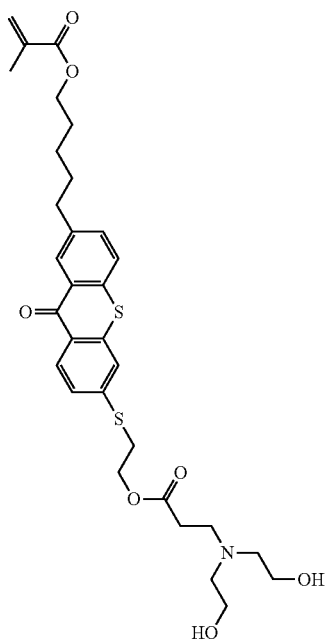
Chemical Formula 1-1 may be obtained by a following synthesis method, but it is not limited thereto.
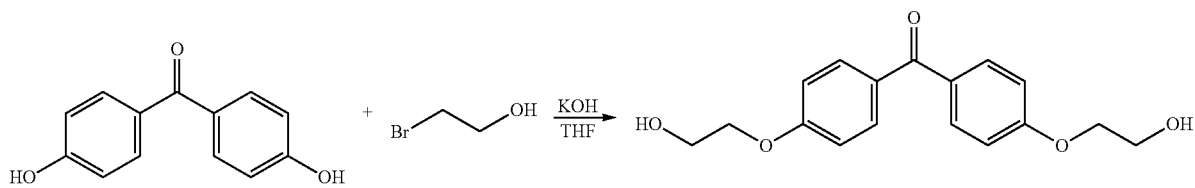

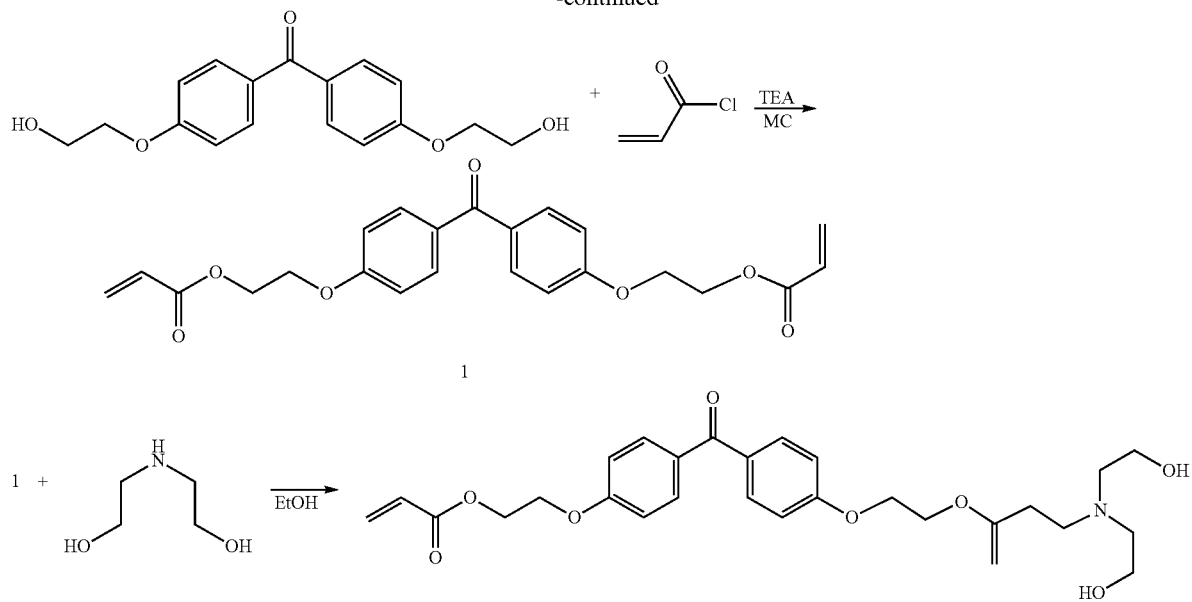
Chemical Formula 1-2 may be obtained by a following synthesis method, but it is not limited thereto.
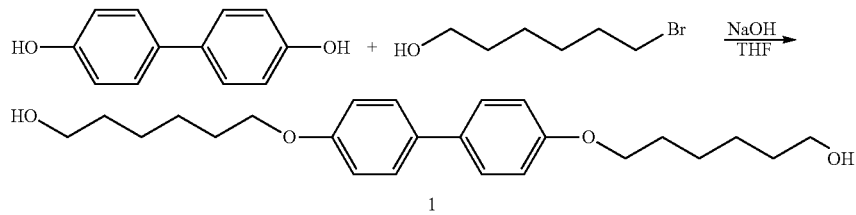
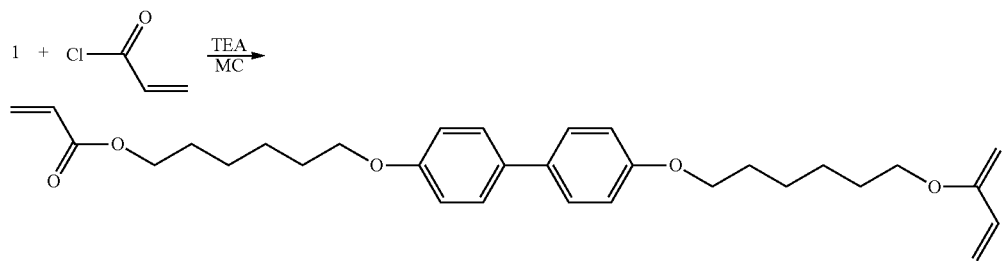
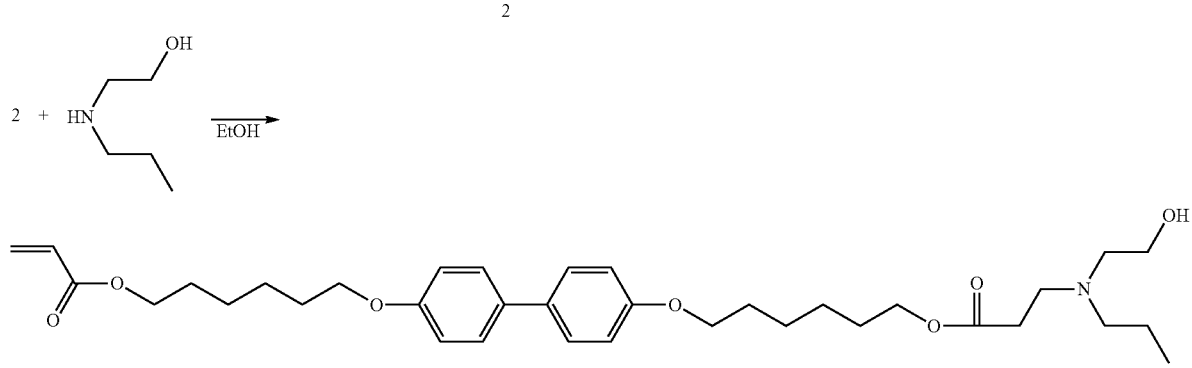

Chemical Formula 1-3 may be obtained by a following synthesis method, but it is not limited thereto.
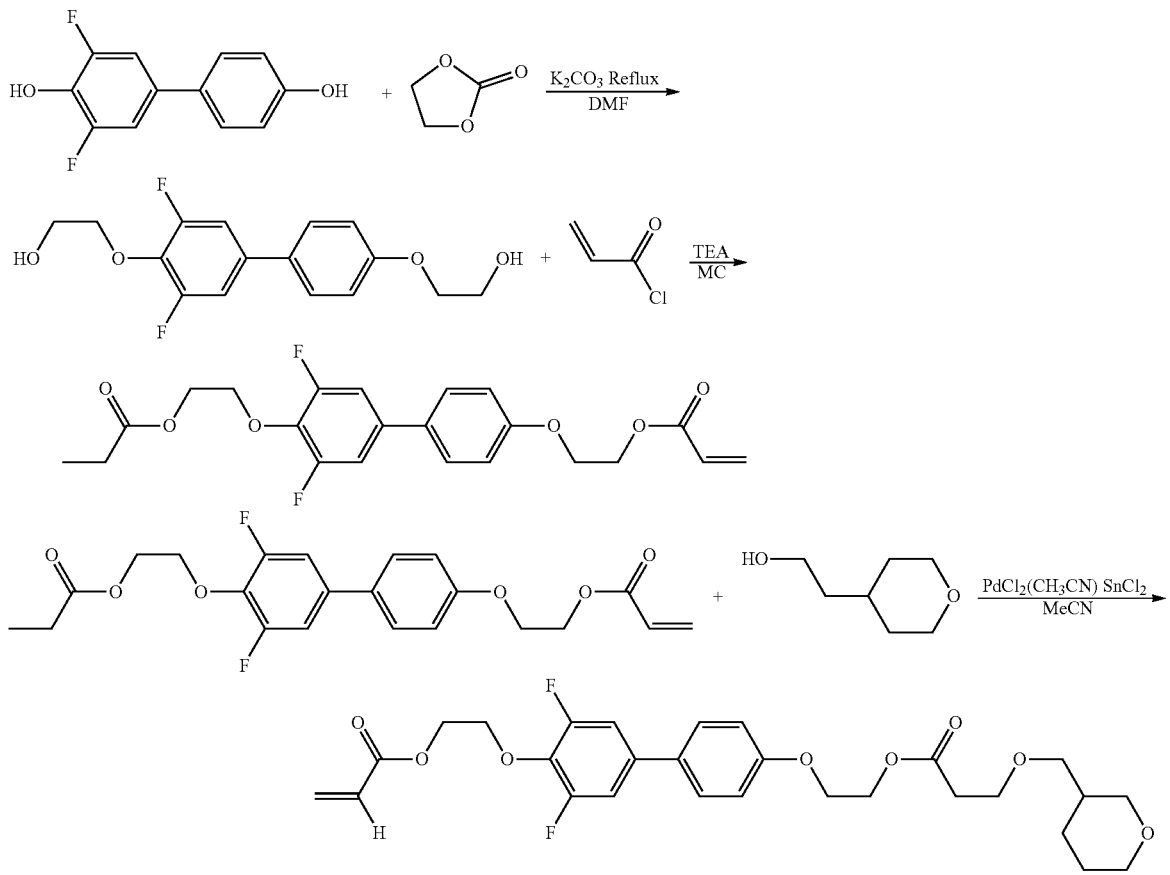
Chemical Formula 1-4 may be obtained by a following synthesis method, but it is not limited thereto.
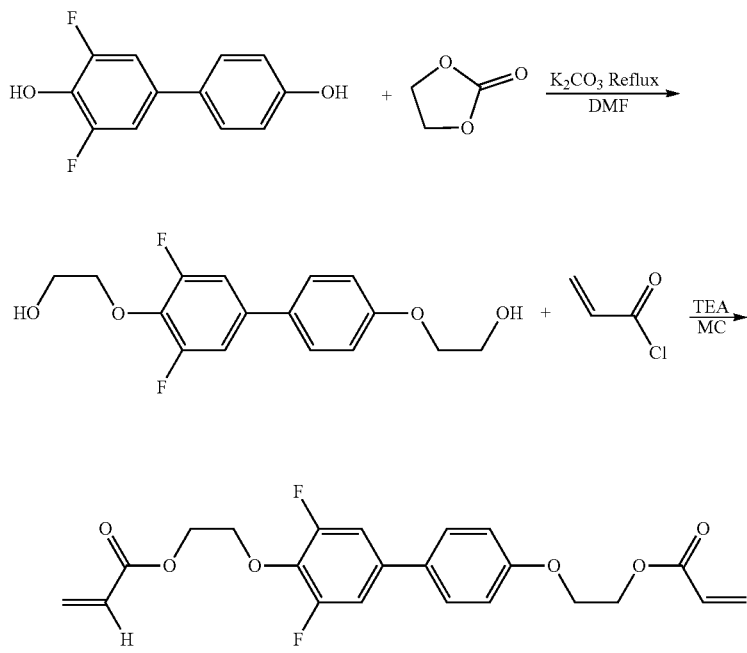

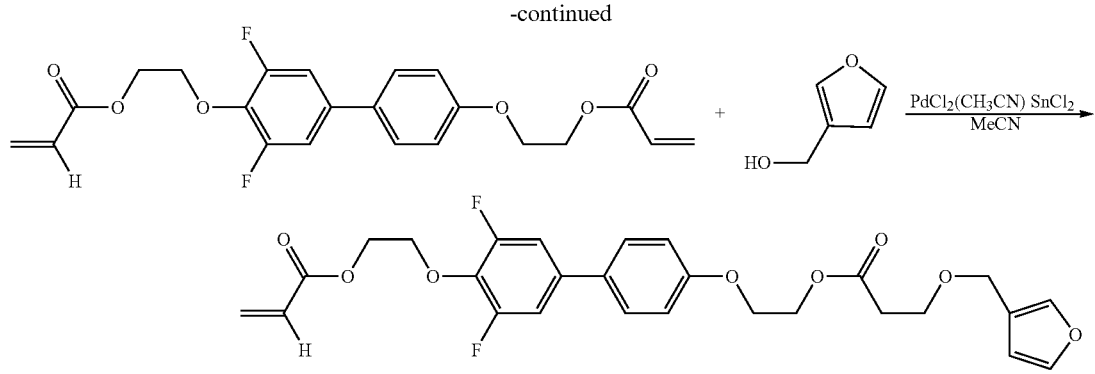
Chemical Formula 1-5 may be obtained by a following synthesis method, but it is not limited thereto.
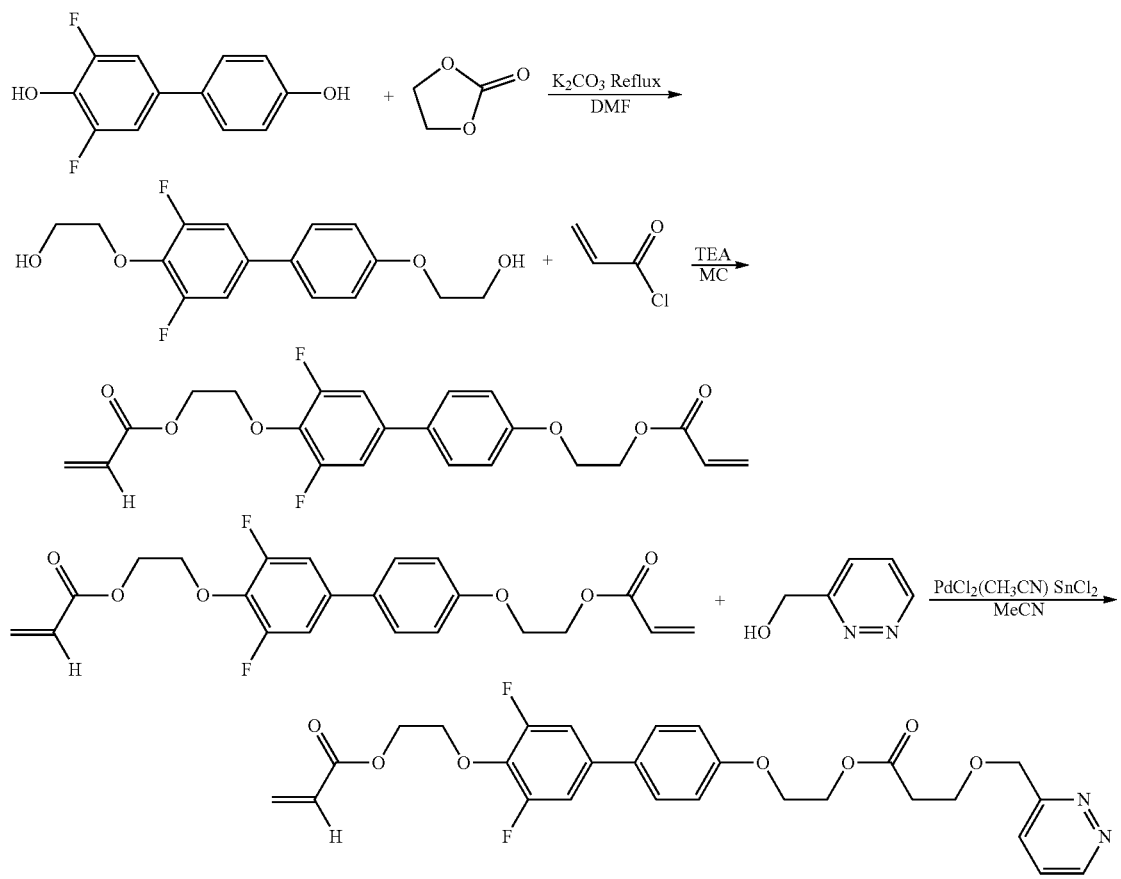
Chemical Formula 1-6 may be obtained by a following synthesis method, but it is not limited thereto.
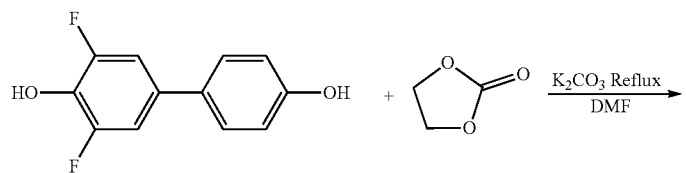

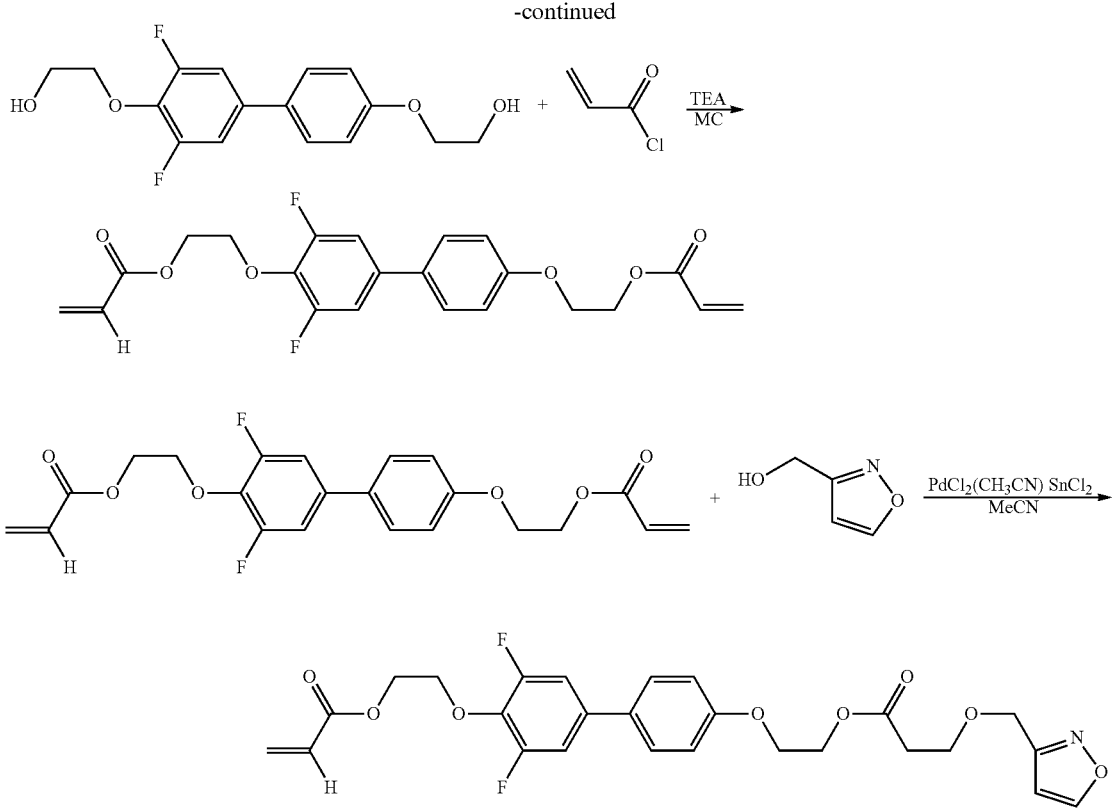

The first compound represented by Chemical Formula 1 may include an anchoring group absorbed to the field generating electrode or the alignment layer while being positioned adjacent to the first substrate 110 and/or the second substrate 210, a vertical alignment group vertically aligning the liquid crystal molecule 31, and an immobilizing group polymerization-reacted with the adjacent compound to provide the pre-tilt to the liquid crystal molecule 31. In Chemical Formula 1, Ra may be the anchoring group, P may be the immobilizing group, and the vertical alignment group may be between Ra and P. As one example, the first compound represented by Chemical Formula 1-1 may include the immobilizing group represented by

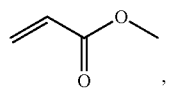

the anchoring group represented by

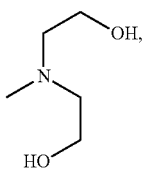

and the vertical alignment group interposed therebetween.

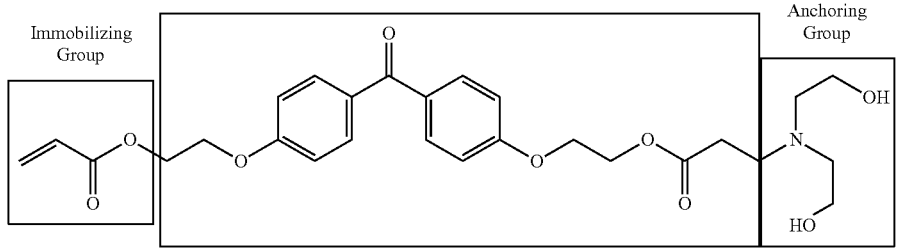

The cross-linker may be a second compound represented by Chemical Formula 2-1 to Chemical Formula 2-12. In this case, n and m of Chemical Formulae 2-5, 2-6, and 2-11 may be an integer of 1 to 12.

The second compound as the cross-linker is bonded with the adjacent first compound or fixes the liquid crystal molecule 31 adjacent to the second compound, thereby improving stability and reliability of the liquid crystal display 10.

[Chemical Formula 2-1]

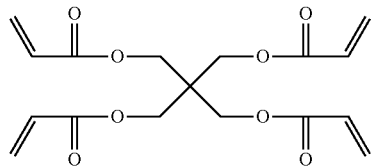

[Chemical Formula 2-2]

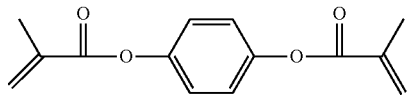

[Chemical Formula 2-3]

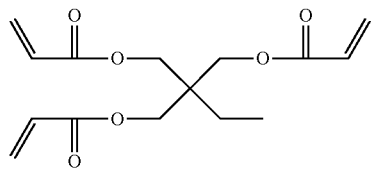

[Chemical Formula 2-4]

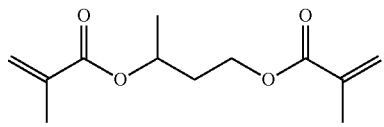

[Chemical Formula 2-5]

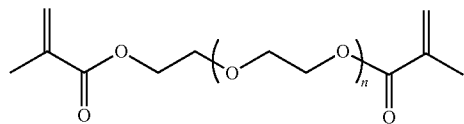

[Chemical Formula 2-6]

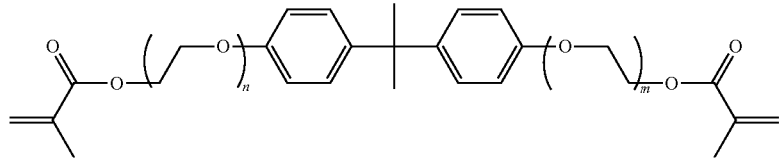

[Chemical Formula 2-7]

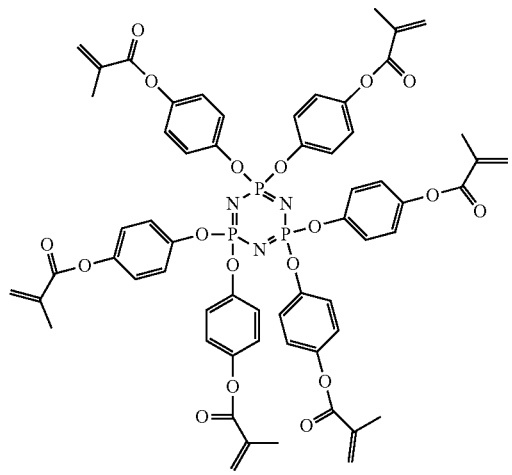

[Chemical Formula 2-8]

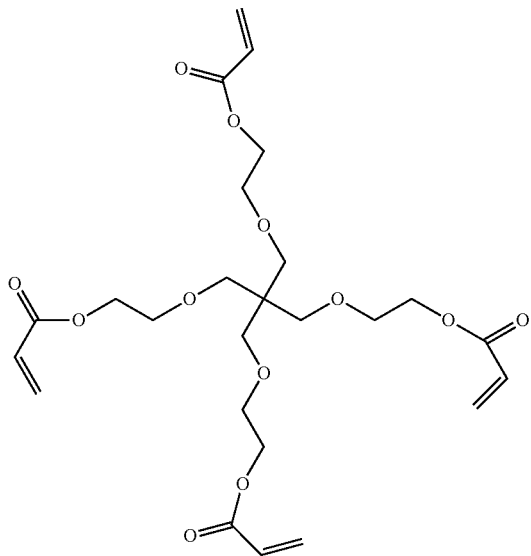

-continued

[Chemical Formula 2-9]

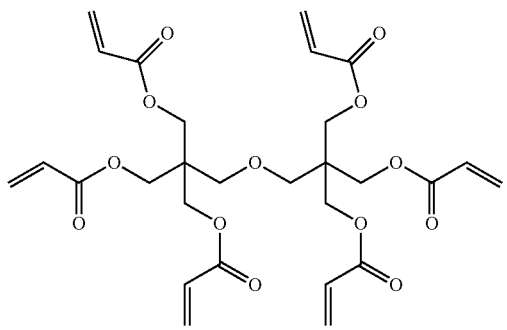

[Chemical Formula 2-10]

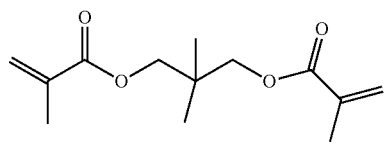

[Chemical Formula 2-11]

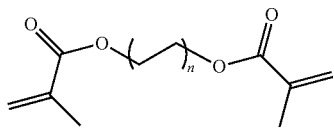

[Chemical Formula 2-12]

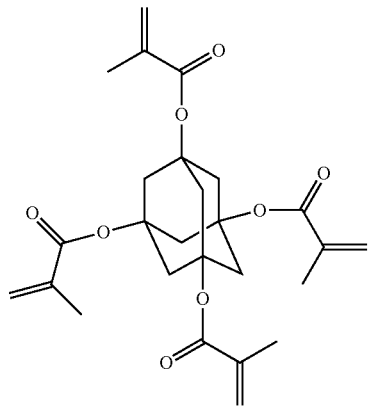

The lower protrusion 13 may include the polymer formed by polymerization-reacting the immobilizing groups of the adjacent first compounds, or may include the polymer formed by polymerization-reacting the immobilizing group of the first compound and the cross-linker. According to the example embodiment, the polymer formed by polymerization-reacting a separate initiator and the first compound or the first compound may be included itself.

The lower protrusion 13 including the above-described polymer may form the pre-tilt to the plurality of liquid crystal molecules 31 adjacent to the lower protrusion 13 without a separate alignment layer or a reactive mesogen. The plurality of liquid crystal molecules 31 adjacent to the lower protrusion 13 may be inclined with respect to the direction perpendicular to the plane surface of the first substrate 110 in the state that the voltage is not applied. In the case that the liquid crystal molecules 31 have the pre-tilt, the liquid crystal molecules 31 may be quickly rotated when subsequently applying the voltage such that the response speed may be increased.

The upper protrusion 14 may be positioned between the common electrode 270 and the liquid crystal layer 3. The upper protrusion 14 may include the first compound represented by Chemical Formula 1. However, the upper protrusion 14 is not limited thereto, and may include the polymer obtained from the first compound and/or the polymer of the first compound and the cross-linker in a small amount.

The anchoring group of the first compound included in the upper protrusion 14 may be positioned adjacent to the common electrode 270, and the immobilizing group may be positioned adjacent to the liquid crystal layer 3. The upper protrusion 14 includes the vertical alignment group included in the first compound, thereby vertically aligning the liquid crystal molecules 31 positioned adjacent to the upper protrusion 14.

A number of the upper protrusions 14 may be smaller than a number of the lower protrusions 13. For example, without being bound by theory, it is believed that the formation reaction of the lower protrusion 13 may dominate during the manufacturing process as the first compound is positioned relatively adjacent to the lower panel 100. As the first compound in the small amount is positioned in the region adjacent to the upper panel 200, it may be difficult for the polymerization reaction between the first compounds and the polymerization reaction between the first compound and the cross-linker to be generated.

The formation of the lower protrusion 13 and the upper protrusion 14 will now be described in detail with reference to FIGS. 2A and 2B.

FIGS. 2A and 2B are cross-sectional views of a manufacturing method of a liquid crystal display 10 according to an example embodiment.

First, referring to FIG. 2A, the lower panel 100 including the pixel electrode 191 is prepared. Next, a liquid crystal material LC1 including the first compound C1 represented by Chemical Formula 1, a cross-linker, for example, at least one among the second compound C2 represented by Chemical Formula 2-1 to 2-12, and the liquid crystal molecules, is dripped on the lower panel 100 by using an ODF (One Drop Filling) process. In this case, according to an example embodiment, the liquid crystal material may further include an initiator (not shown) promoting the polymerization reaction between the first compounds.

Next, as shown in FIG. 2B, the upper panel 200 including the common electrode 270 is combined with the lower panel 100. A UV electric field process is executed to the combined lower panel 100 and upper panel 200, thereby forming the lower protrusions 13 and the upper protrusions 14 as shown in FIG. 1.

According to the ODF process, the first compound C1 and the second compound C2 may be positioned relatively adjacent to the lower panel 100. The plurality of first compounds adjacent to the lower panel 100 are polymerization-reacted to form the polymer obtained from the first compound or the polymer formed by the polymerization reaction of the first compound C1 and the second compound C2. The lower protrusion 13 including these polymers may make the liquid crystal molecules 31 adjacent thereto oblique.

A relatively small amount of the first compound C1 is located on the upper panel 200, and almost none of the initiator promoting the polymerization reaction of the first compound C1 and the second compound C2 is located there. In the region adjacent to the upper panel 200, the first compound C1 absorbed to the common electrode 270 is mostly present, and the first compound C1 itself may form the upper protrusion 14. However, it is not limited thereto, and the upper protrusion 14 may include a small amount of the polymer obtained from the first compound C1 or the polymer of the first compound and the second compound. The upper protrusion 14 may vertically align the liquid crystal molecule 31 adjacent thereto through the vertical alignment group of the first compound C1.

As described above, the manufacturing method of the liquid crystal display according to an example embodiment does not separately include a coating and drying process of the alignment layer. Instead, after the liquid crystal material is mixed with the first compound and the second compound and injected, the protrusion capable of vertically aligning the liquid crystal molecules or pre-tilting the liquid crystal molecules by the electric field UV irradiation process is formed like the alignment layer, thereby simplifying the manufacturing process.

Now, the liquid crystal display according to a variation example embodiment of FIG. 1 will be described with reference to FIG. 3 and FIGS. 4A, 4B, and 4C.

Figure 3:
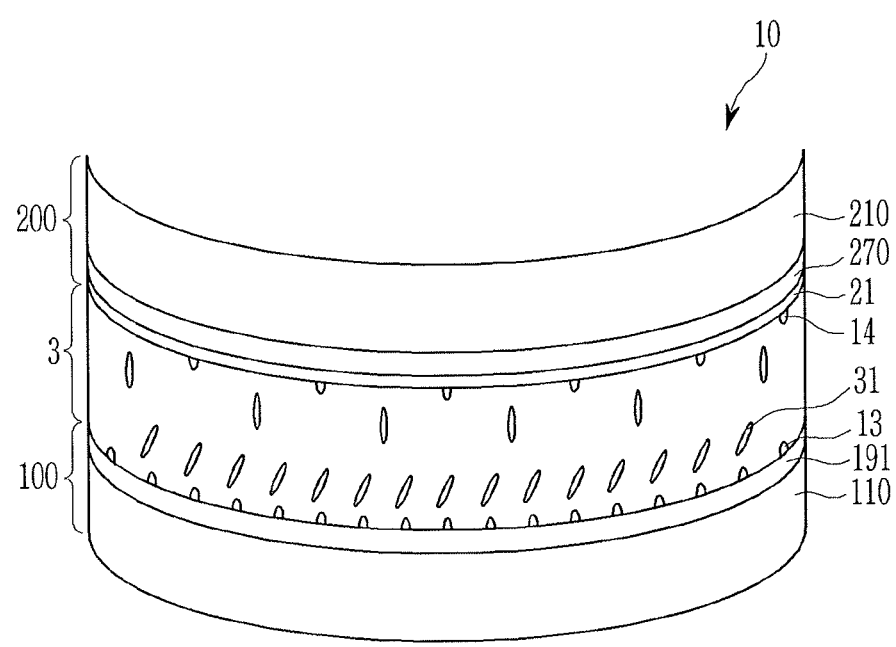
FIG. 3 illustrates a cross-sectional view of a curved liquid crystal display according to a variation example embodiment of FIG. 1.

FIG. 3 is a cross-sectional view of a curved liquid crystal display according to a variation example embodiment of FIG. 1, and FIGS. 4A, 4B, and 4C are cross-sectional views for a manufacturing method of a curved liquid crystal display according to an example embodiment of FIG. 3.

The description of the same or similar constituent elements to those of the above-described example embodiment may be omitted.

The lower panel 100 includes a plurality of lower protrusions 13 positioned between the pixel electrode 191 and the liquid crystal layer 3, and the liquid crystal molecules 31 positioned adjacent to the lower protrusion 13 may have the pre-tilt.

The upper panel 200 includes an upper alignment layer 21 positioned between the common electrode 270 and the liquid crystal layer 3. The upper alignment layer 21 may be a vertical alignment layer, and the liquid crystal molecules 31 adjacent to the upper alignment layer 21 may be vertically aligned with the pre-tilt. Also, the upper protrusion 14 of the small amount may be positioned between the common electrode 270 and the liquid crystal layer 3.

The lower protrusion 13 and the upper protrusion 14 of FIG. 3 are the same as those described in FIG. 1 such that the detailed description thereof is omitted.

The lower protrusion 13 may include at least one among the first compound represented by Chemical Formula 1, the polymer obtained from the first compound represented by Chemical Formula 1, and the polymer of the first compound and the second compound.

Most of the upper protrusion 14 may include the first compound represented by Chemical Formula 1, however it is not limited thereto, and the polymer obtained from the first compound represented by Chemical Formula 1 and the polymer of the first compound and the second compound may be included at a small amount.

The manufacturing method of the liquid crystal display having the structure like FIG. 3 will be described with reference to FIGS. 4A, 4B, and 4C.

Figure 4A:
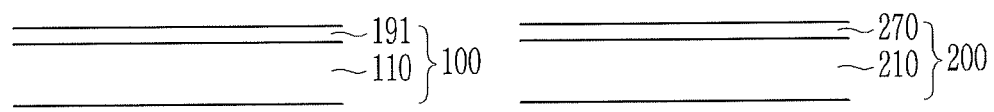
FIGS. 4A, 4B, and 4C illustrate cross-sectional views for a manufacturing method of a curved liquid crystal display according to an example embodiment of FIG. 3.

First, as shown in FIG. 4A, the lower panel 100 including the pixel electrode 191 and the upper panel 200 including the common electrode 270 are prepared.

Figure 4B:
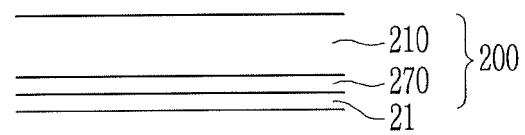
Figure 4B:
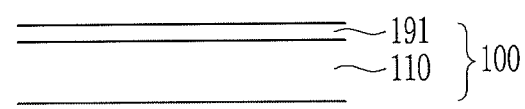

Next, as shown in FIG. 4B, the upper panel 200, in which the upper alignment layer 21 is formed on the common electrode 270, and the lower panel 100, are combined.

Figure 4C:
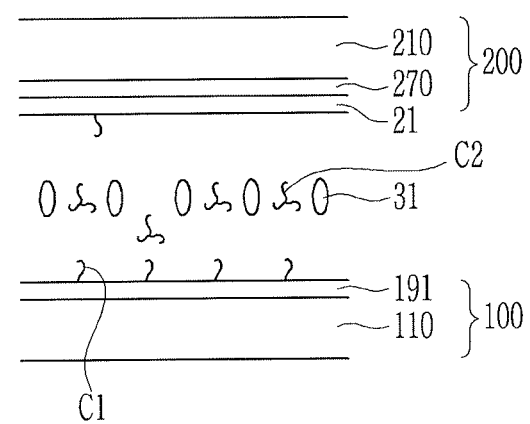

Next, as shown in FIG. 4C, the liquid crystal material including the first compound C1 represented by Chemical Formula 1, at least one of the second compound C2 represented by Chemical Formulae 2-1 to 2-12, and the liquid crystal molecules 31 is injected between the lower panel 100 and the upper panel 200.

The first compound C1 and the second compound C2 may have poor bonding force or adsorptive force with the upper alignment layer 21 including the organic material such that the first compound C1 and the second compound C2 of a relatively large amount may be positioned adjacent to the lower panel 100.

The first compound C1 and the second compound C2 positioned adjacent to the lower panel 100 form a plurality of lower protrusions 13 through the UV electric field process as shown in FIG. 3. The liquid crystal molecules 31 positioned adjacent to the lower panel 100 may be arranged to have the pre-tilt by the plurality of lower protrusions 13.

In the region adjacent to the upper alignment layer 21, the liquid crystal molecules 31 may be aligned vertically with respect to the second substrate 210 by the upper alignment layer 21 of the vertical alignment layer. Also, the first compound C1 of the small amount may be absorbed to the upper alignment layer 21, and the first compounds C1 may form the upper protrusion 14 without a separate bonding reaction.

Figure 5:
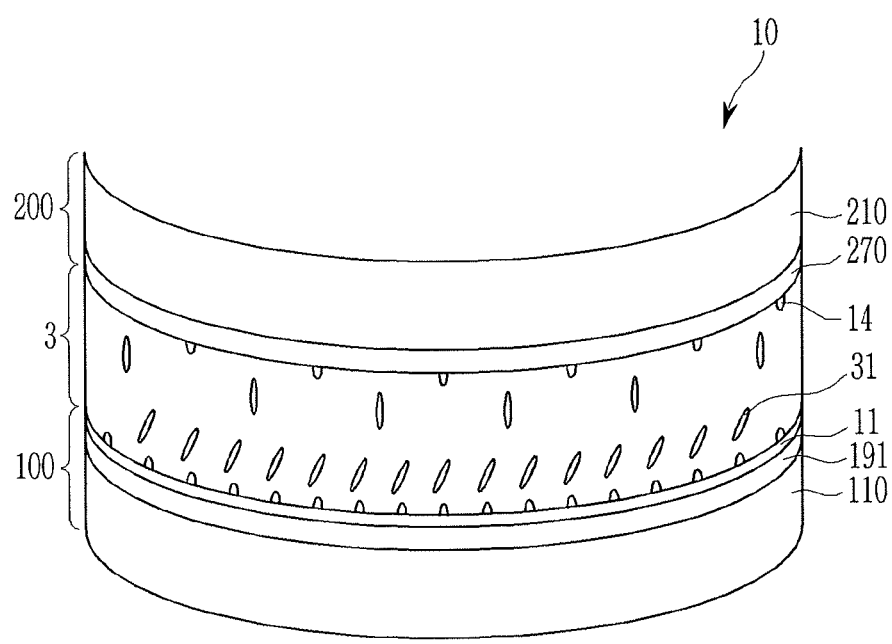
FIG. 5 illustrates a cross-sectional view of a curved liquid crystal display according to a variation example embodiment of FIG. 1.

Next, the liquid crystal display according to a variation example embodiment will be described with reference to FIG. 5 and FIGS. 6A, 6B, and 6C. FIG. 5 is a cross-sectional view of a curved liquid crystal display according to a variation example embodiment of FIG. 1, and FIGS. 6A, 6B, and 6C are cross-sectional views for a manufacturing method of a curved liquid crystal display according to an example embodiment of FIG. 5.

The description of the same or similar constituent elements to those of the above-described example embodiment may be omitted.

The lower panel 100 includes the lower alignment layer 11 and the plurality of lower protrusions 13 positioned between the pixel electrode 191 and the liquid crystal layer 3, and the upper panel 200 includes the plurality of upper protrusions 14 positioned between the common electrode 270 and the liquid crystal layer 3.

As described above, the lower protrusion 13 may include the first compound represented by Chemical Formula 1, the polymer obtained from the first compound, or the polymer of the first compound and the second compound. Also, the lower alignment layer 11 according to an example embodiment may include the initiator, and the lower protrusion 13 may have a form such that the initiator and the first compound are polymerized.

The upper protrusion 14 may include the first compound represented by Chemical Formula 1. Also, according to an example embodiment, the polymer obtained from the first compound and the polymer of the first compound and the second compound may be included in the small amount.

The number of lower protrusions 13 may be larger than the number of upper protrusions 14. For example, without being bound by theory, the initiator included in the lower alignment layer 11 may have a force inducing the first compound, and if the first compound is injected between the lower panel 100 and the upper panel 200 in the manufacturing process, the first compound may move in the direction adjacent to the lower alignment layer 11 including the initiator.

Next, the manufacturing method of the display device will be described with reference to FIGS. 6A, 6B, and 6C.

Figure 6A:
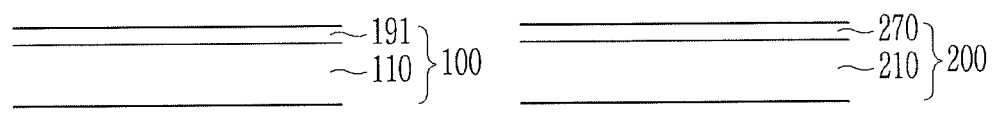
FIGS. 6A, 6B, and 6C illustrate cross-sectional views for a manufacturing method of a curved liquid crystal display according to an example embodiment of FIG. 5.

As shown in FIG. 6A, the lower panel 100 including the pixel electrode 191 positioned on the first substrate 110 and the upper panel 200 including the common electrode 270 positioned on the second substrate 210 are prepared.

Figure 6B:
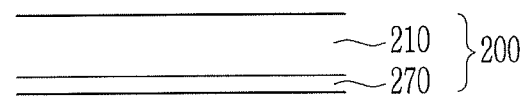
Figure 6B:
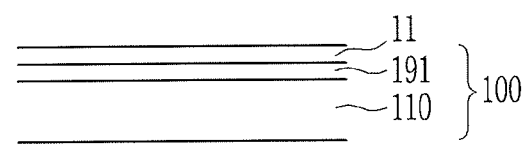

Next, as shown in FIG. 6B, the lower alignment layer 11 including the initiator is formed on the pixel electrode 191, and the prepared lower panel 100 and upper panel 200 are combined.

Figure 6C:
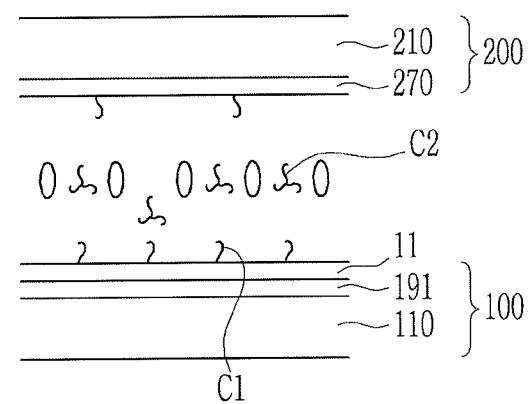

Then, as shown in FIG. 6C, the liquid crystal material including the first compound C1 and the second compound C2 is injected between the lower panel 100 and the upper panel 200. Subsequently, if the UV electric field process is executed to the pixel electrode 191 and the common electrode 270, the initiator included in the lower alignment layer 11 induces the first compound C1 in the direction of the lower panel 100 to be polymerization-reacted with the first compound C1, or is polymerization-reacted between the adjacent first compounds C1, or is polymerization-reacted between the first compound C1 and the second compound C2 adjacent to each other, thereby forming the plurality of lower protrusions 13 as shown in FIG. 5.

Further, the first compound C1 may be partially positioned between the liquid crystal layer 3 and the common electrode 270. The first compound C1 may form the upper protrusion 14. The upper protrusion 14 may vertically align the adjacent liquid crystal molecules 31 through the vertical alignment group of the first compound.

Next, the display device according to an example embodiment will be described with reference to FIG. 7 and FIG. 8.

Figure 7:
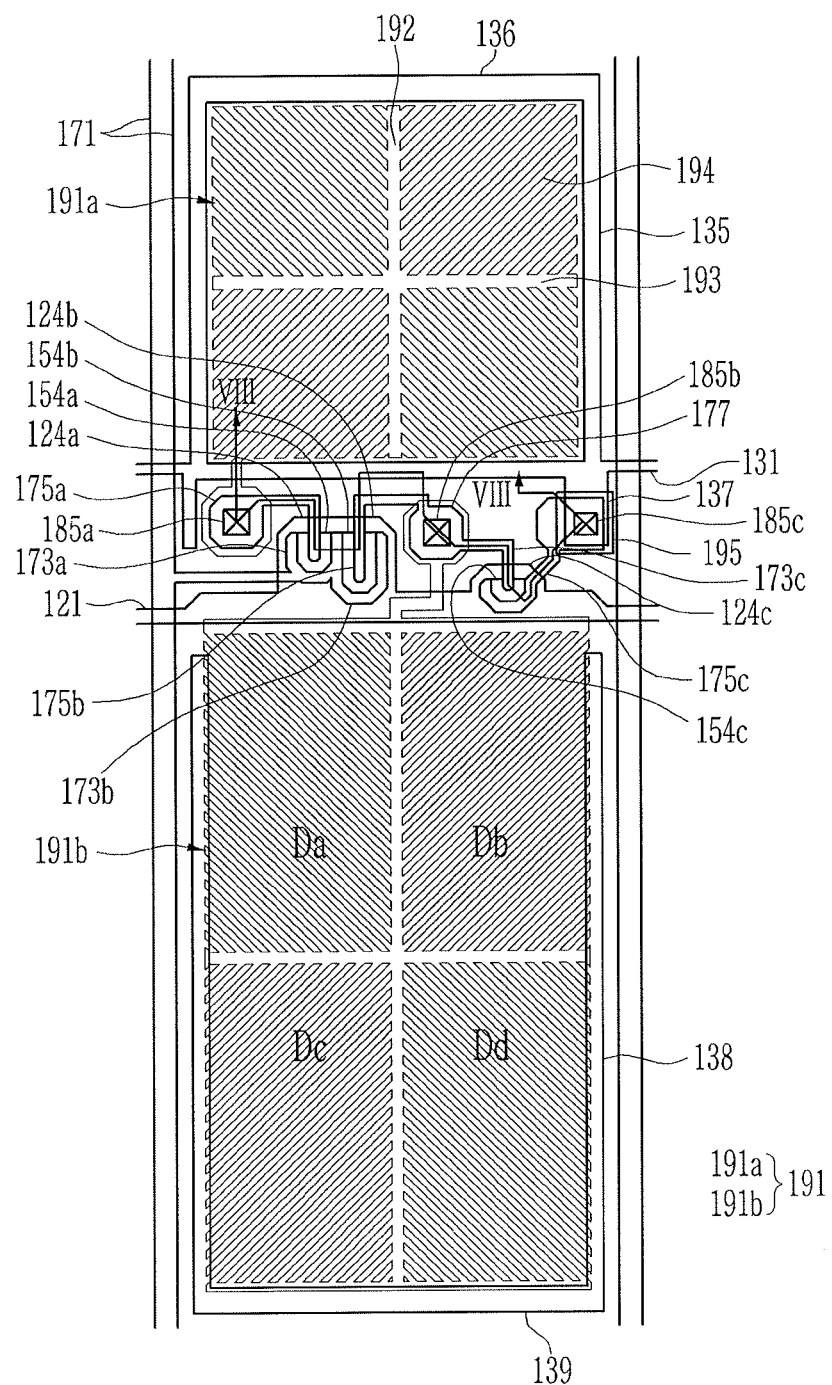
FIG. 7 illustrates a top plan view of one pixel according to an example embodiment.
Figure 8:
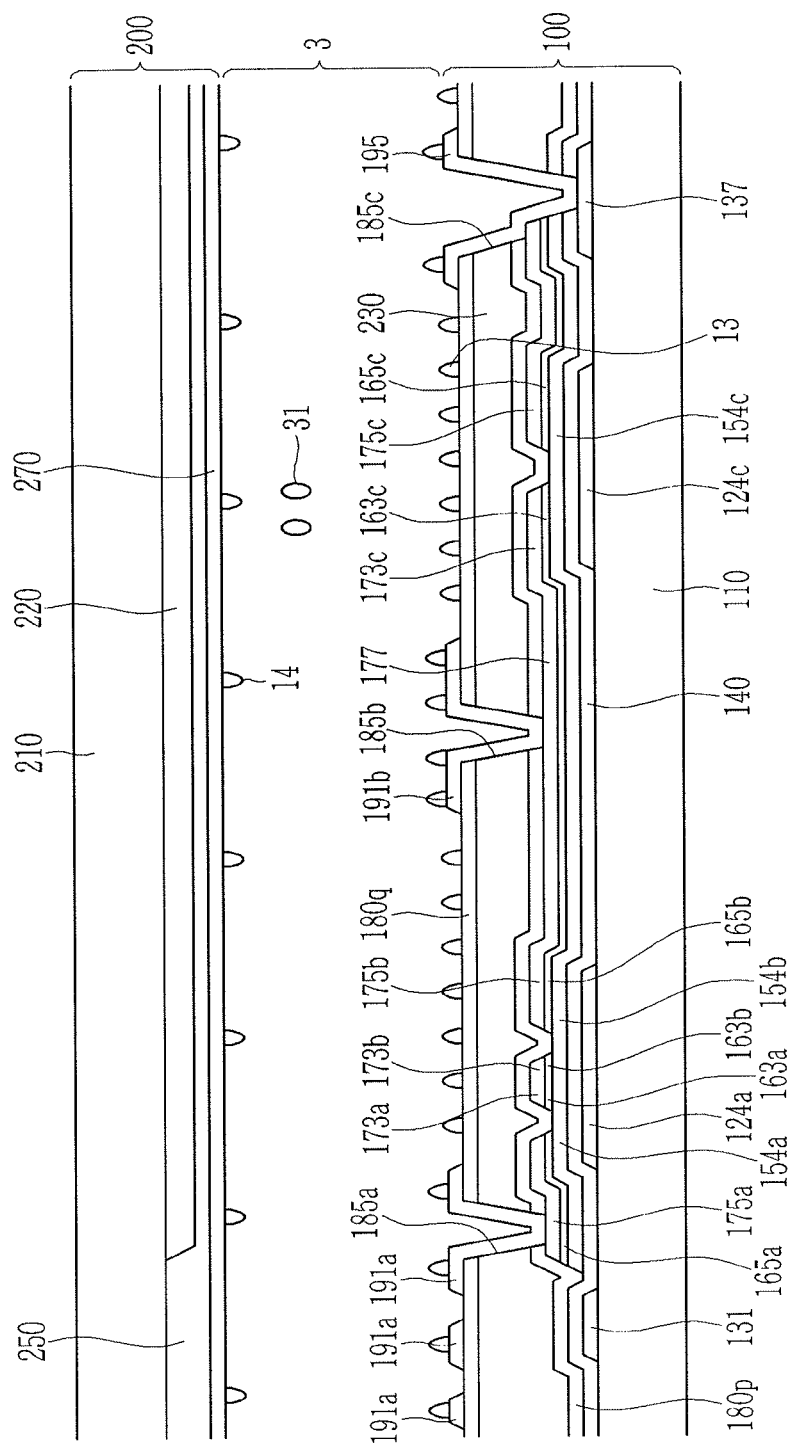
FIG. 8 illustrates a cross-sectional view taken along a line VIII-VIII of FIG. 7.

FIG. 7 is a top plan view of one pixel according to an example embodiment, and FIG. 8 is a cross-sectional view taken along a line VIII-VIII of FIG. 7.

Referring to FIG. 7, the lower panel 100 will be described.

A gate conductor including a gate line 121 and a divided reference voltage line 131 is disposed on a first substrate 110. The gate line 121 includes a first gate electrode 124a, a second gate electrode 124b, and a third gate electrode 124c. The divided reference voltage line 131 includes first storage electrodes 135 and 136 and a reference electrode 137. Though not coupled to the divided reference voltage line 131, second storage electrodes 138 and 139 are also disposed to overlap a second sub-pixel electrode 191b.

A gate insulating layer 140 is positioned on the gate line 121 and the divided reference voltage line 131.

A first semiconductor layer 154a, a second semiconductor layer 154b, and a third semiconductor layer 154c are positioned on the gate insulating layer 140. Ohmic contacts 163a, 165a, 163b, 165b, 163c, and 165c may be positioned on the semiconductor layers 154a, 154b, and 154c, and may be omitted according to an example embodiment.

A data conductor including a data line 171 connected to a first source electrode 173a and a second source electrode 173b positioned on the ohmic contacts 163a, 165a, 163b, 165b, 163c, and 165c and the gate insulating layer 140, a first drain electrode 175a, a second drain electrode 175b, a third source electrode 173c, and a third drain electrode 175c is positioned.

The first gate electrode 124a, the first source electrode 173a, and the first drain electrode 175a configure a first thin film transistor along with the first semiconductor layer 154a, the second gate electrode 124b, the second source electrode 173b, and the second drain electrode 175b configure a second thin film transistor along with the second semiconductor layer 154b, and the third gate electrode 124c, the third source electrode 173c, and the third drain electrode 175c configure a third thin film transistor along with the third semiconductor layer 154c.

The second drain electrode 175b includes an extension 177 connected to the third source electrode 173c and widely extended.

A first passivation layer 180p is positioned on the data conductors 171, 173c, 175a, 175b, and 175c and the semiconductor layers 154a, 154b, and 154c.

A color filter 230 is positioned on the first passivation layer 180p. The color filter 230 extends in the vertical direction along two data lines 171 adjacent to each other. The color filter 230 is included in the lower panel 100 in the present example embodiment, however it is not limited thereto, and the color filter 230 may be included in the upper panel 200.

A second passivation layer 180q is positioned on the color filter 230. The first passivation layer 180p and the second passivation layer 180q may include an inorganic insulating layer such as a silicon nitride or a silicon oxide.

The second passivation layer 180q prevents the color filter 230 from lifting and suppresses contamination of the liquid crystal layer 3 by an organic material such as a solvent flowing from the color filters 230 such defects such as an afterimage that may be generated during driving may be prevented.

The first passivation layer 180p and the second passivation layer 180q have a first contact hole 185a and a second contact hole 185b respectively overlapping the first drain electrode 175a and the second drain electrode 175b.

The first passivation layer 180p, the second passivation layer 180q, and the gate insulating layer 140 have a third contact hole 185c overlapping part of the reference electrode 137 and part of the third drain electrode 175c, and the third contact hole 185c is covered by a connecting member 195. The connecting member 195 electrically connects the reference electrode 137 and the third drain electrode 175c overlapping the third contact hole 185c.

A pixel electrode 191 is positioned on the second passivation layer 180q. The pixel electrode 191 is one of the field generating electrodes. Pixel electrodes 191 are separated from each other while the gate line 121 is interposed therebetween, and each of the pixel electrodes 191 includes a first sub-pixel electrode 191a and the second sub-pixel electrode 191b adjacent in a column direction based on the gate line 121.

The overall shape of the first sub-pixel electrode 191a and the second sub-pixel electrode 191b is quadrangular, and includes a cross-shaped stem that is formed of a transverse stem 193 and a vertical stem 192 that is perpendicular thereto. Also, each of the first sub-pixel electrode 191a and the second sub-pixel electrode 191b is divided into a first sub-region Da, a second sub-region Db, a third sub-region Dc, and a fourth sub-region Dd by the transverse stem 193 and the vertical step 192, and includes a plurality of minute branches 194 positioned in each of the sub-regions Da-Dd.

The first sub-pixel electrode 191a and the second sub-pixel electrode 191b are respectively connected to the first drain electrode 175a or the second drain electrode 175b through the first contact hole 185a and the second contact hole 185b, thereby receiving the data voltage from the first drain electrode 175a and the second drain electrode 175b. In this case, the data voltage applied to the second drain electrode 175b is partially divided by the third source electrode 173c such that a voltage applied to the first sub-pixel electrode 191a is greater than that applied to the second sub-pixel electrode 191b.

The first sub-pixel electrode 191a and the second sub-pixel electrode 191b, to which a data voltage is applied, generate an electric field together with the common electrode 270 of the upper panel 200, thereby determining orientation of the liquid crystal molecules 31 of the liquid crystal layer 3 between the two electrodes 191 and 270. Luminance of light passing through the liquid crystal layer 3 may vary depending on the determined orientation of the liquid crystal molecules 31.

The description related to the thin film transistor and the pixel electrode 191 described so far is one example, and the structure of the thin film transistor and the design of the pixel electrode 191 may be varied to improve lateral visibility.

The lower protrusion 13 is positioned between the pixel electrode 191 and the liquid crystal layer 3. The lower protrusion 13 is the same as the lower protrusion 13 described with reference to FIG. 1. The present embodiment shows the lower protrusion 13 according to the example embodiment of FIG. 1, however it is not limited thereto, and the lower protrusion 13 and the upper alignment layer 21 according to FIG. 3 may be included, and it may be substituted with the lower alignment layer 11, the lower protrusion 13, and the upper protrusion 14 according to FIG. 5. The detailed description for the above-describe constituent elements is omitted.

Next, the upper panel 200 will be described.

A second substrate 210 is positioned to be separated from or overlap the first substrate 110. A light blocking member 220 is positioned between the second substrate 210 and the liquid crystal layer 3. The light blocking member 220 is positioned on the upper panel 200 to overlap a region where the data line 171 of the lower panel 100 is positioned and a region where the thin film transistor is positioned. The present embodiment describes and shows the example embodiment in which the light blocking member 220 is included in the upper panel 200, however the example embodiment is not limited thereto, and the light blocking member may be included in the lower panel 100.

An overcoat 250 is positioned between the light blocking member 220 and the liquid crystal layer 3. The overcoat 250 may be omitted according to an example embodiment.

The common electrode 270 as one of the field generating electrodes is positioned between the overcoat 250 and the liquid crystal layer 3. The common electrode 270 generates the electric field along with the pixel electrode 191 of the lower panel 100, thereby determining the direction of the liquid crystal molecules 31 of the liquid crystal layer 3.

The upper protrusion 14 is positioned between the common electrode 270 and the liquid crystal layer 3, and the upper protrusion 14 is the same as that described with reference to FIG. 1.

The liquid crystal layer 3 includes the liquid crystal molecules 31. The liquid crystal layer 3 may further include the first compound represented by Chemical Formula 1 in a non-reaction state and/or the second compound represented by Chemical Formulae 2-1 to 2-12. Some of the compound may not be reacted during the process of forming the protrusion to remain in the liquid crystal layer.

Next, the first compound represented by Chemical Formula 1 will be described through FIG. 9 to FIG. 14.

FIG. 9, FIG. 10, FIG. 11, FIG. 12, FIG. 13, and FIG. 14 are NMR spectra of a first compound according to an example embodiment.

Figure 9:
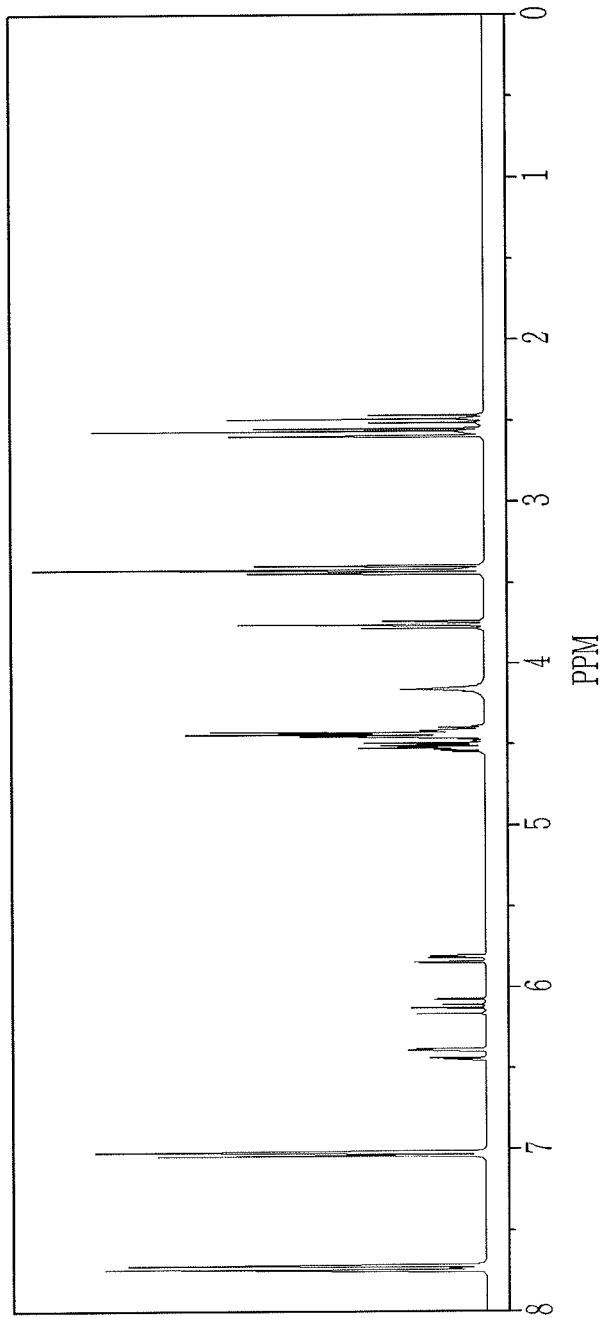
FIG. 9, FIG. 10, FIG. 11, FIG. 12, FIG. 13, and FIG. 14 illustrate NMR spectra of a first compound according to example embodiments.
Figure 10:
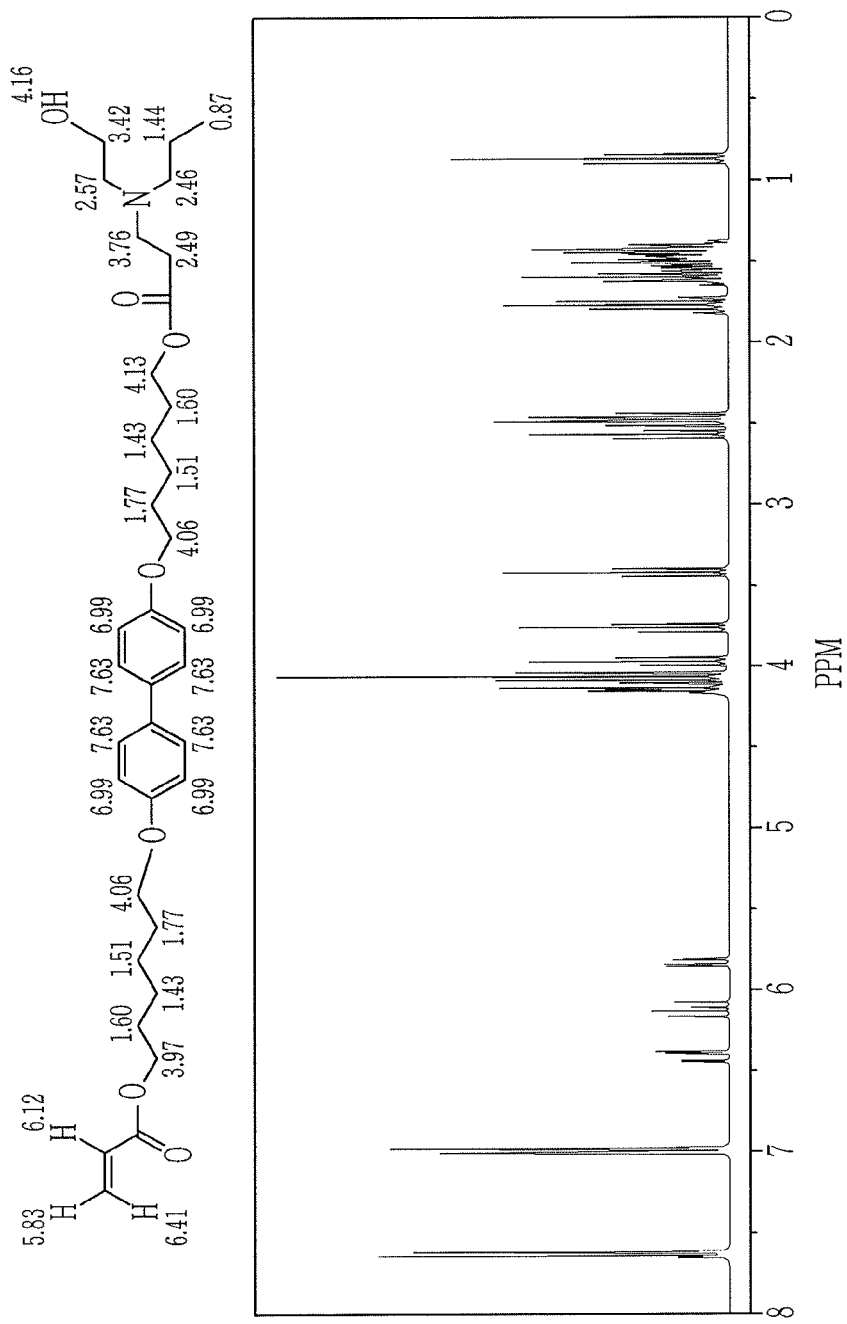
Figure 11:
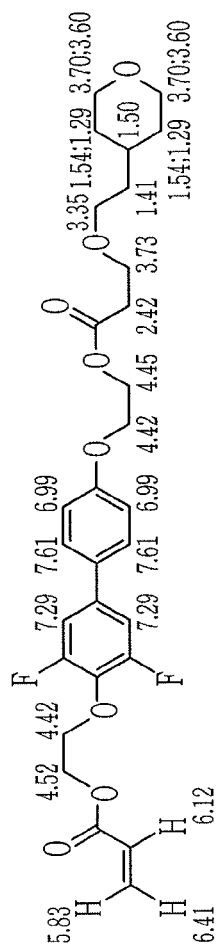
Figure 11:
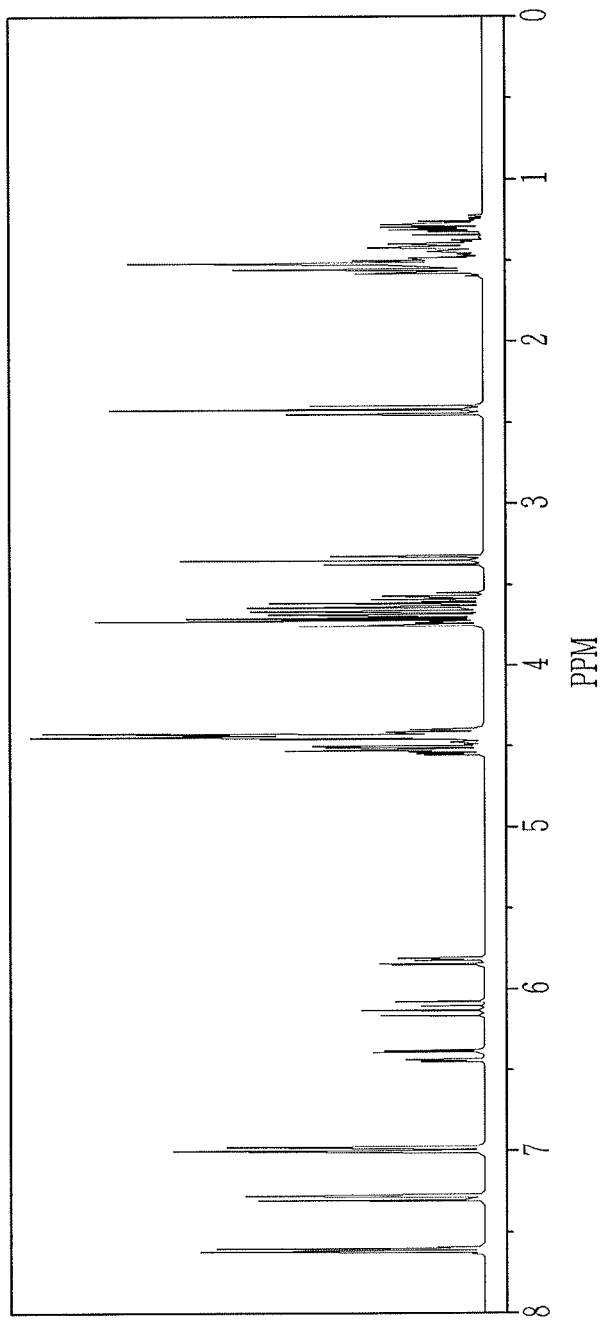
Figure 12:
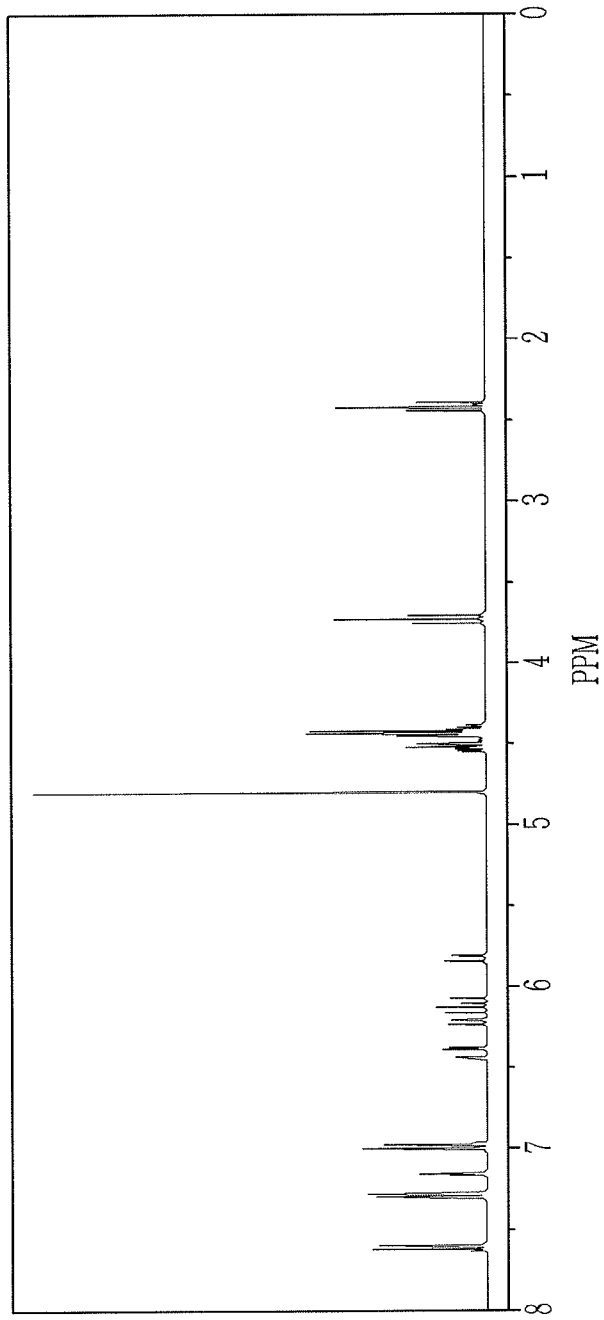
Figure 13:
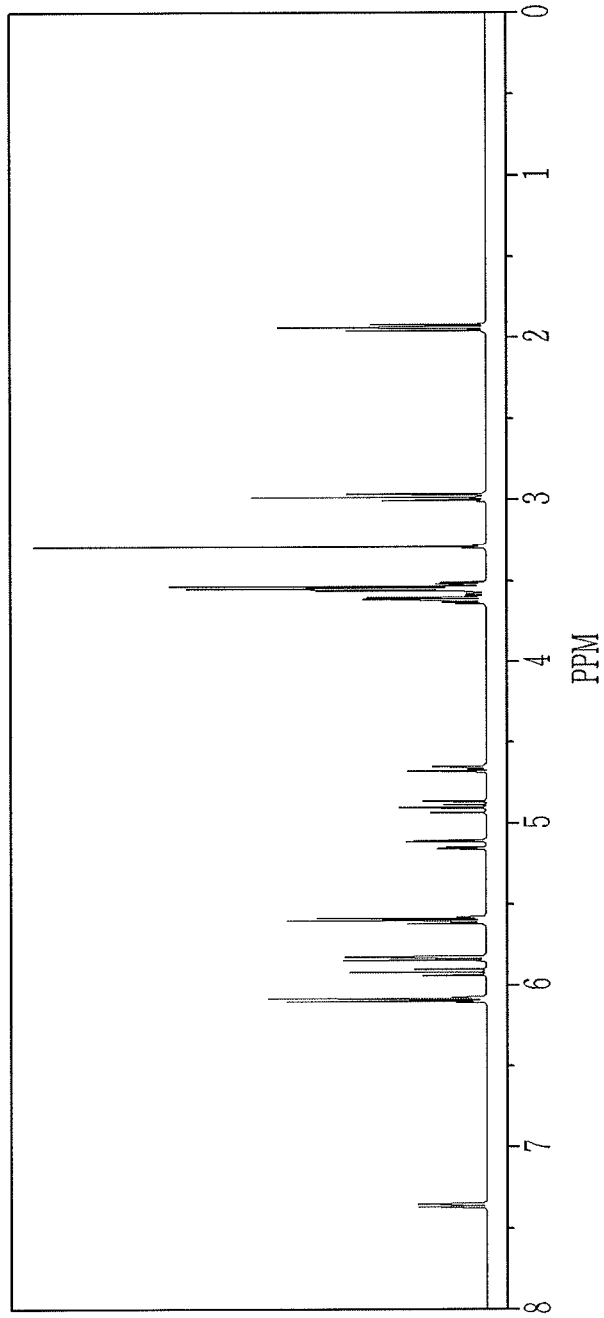
Figure 14:
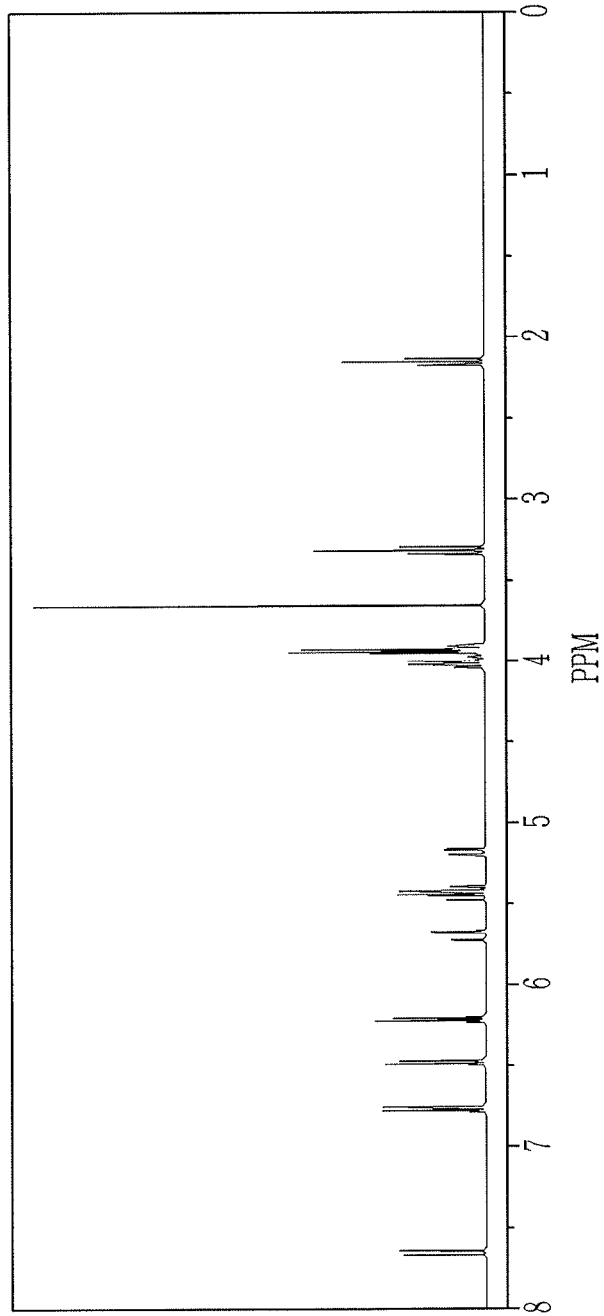

FIG. 9 is the NMR spectrum graph for the first compound represented by Chemical Formula 1-1, FIG. 10 is the NMR spectrum graph for the first compound represented by Chemical Formula 1-2, FIG. 11 is the NMR spectrum graph for the first compound represented by Chemical Formula 1-3, FIG. 12 is the NMR spectrum graph for the first compound represented by Chemical Formula 1-4, FIG. 13 is the NMR spectrum graph for the first compound represented by Chemical Formula 1-5, and FIG. 14 is the NMR spectrum graph for the first compound represented by Chemical Formula 1-6. Each of these is the first compound obtained by using the above-described synthesis method, and it is confirmed that the compounds represented by Chemical Formulae 1-1, 1-2, 1-3, 1-4, 1-5, and 1-6 are obtained as shown in FIG. 9 to FIG. 14.

Next, a physical characteristic of the first compound according to an example embodiment obtained as above-described and a comparative example are compared.

TABLE 1
| Example 1 | Example 2 | Example 3 | Example 4 |
|---|---|---|---|
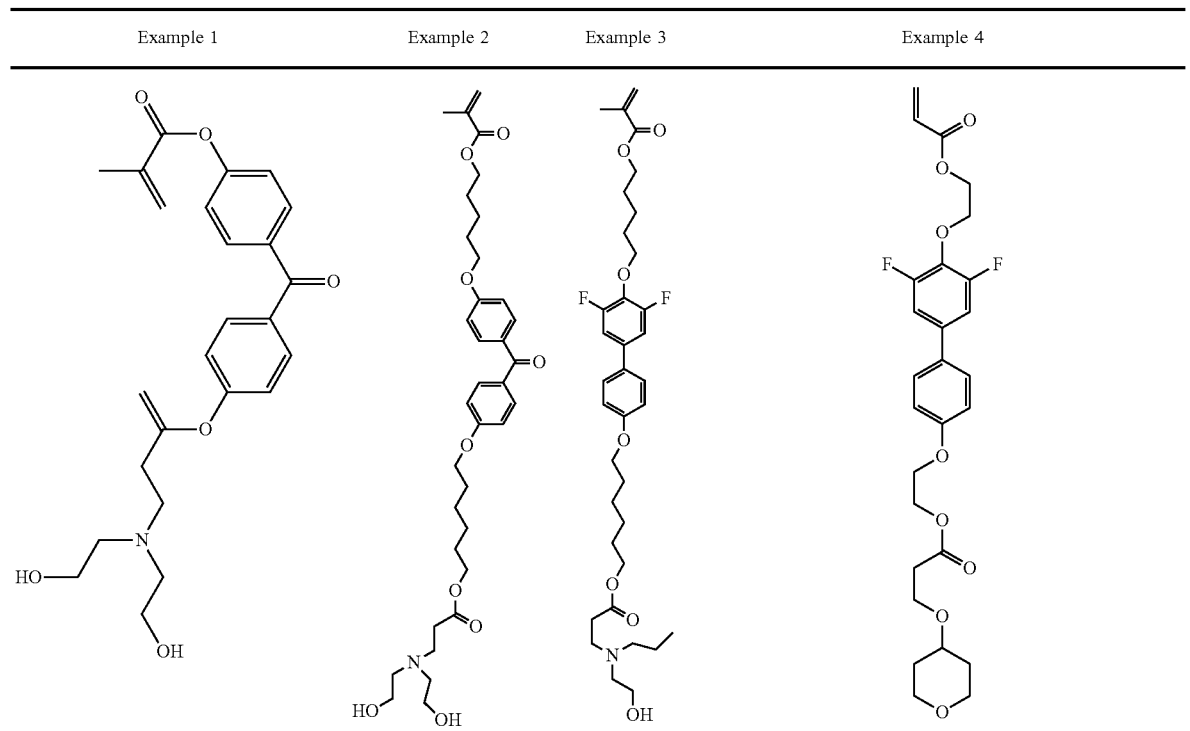
| Example 5 | Example 6 | Example 7 | Comparative Example |
|---|---|---|---|
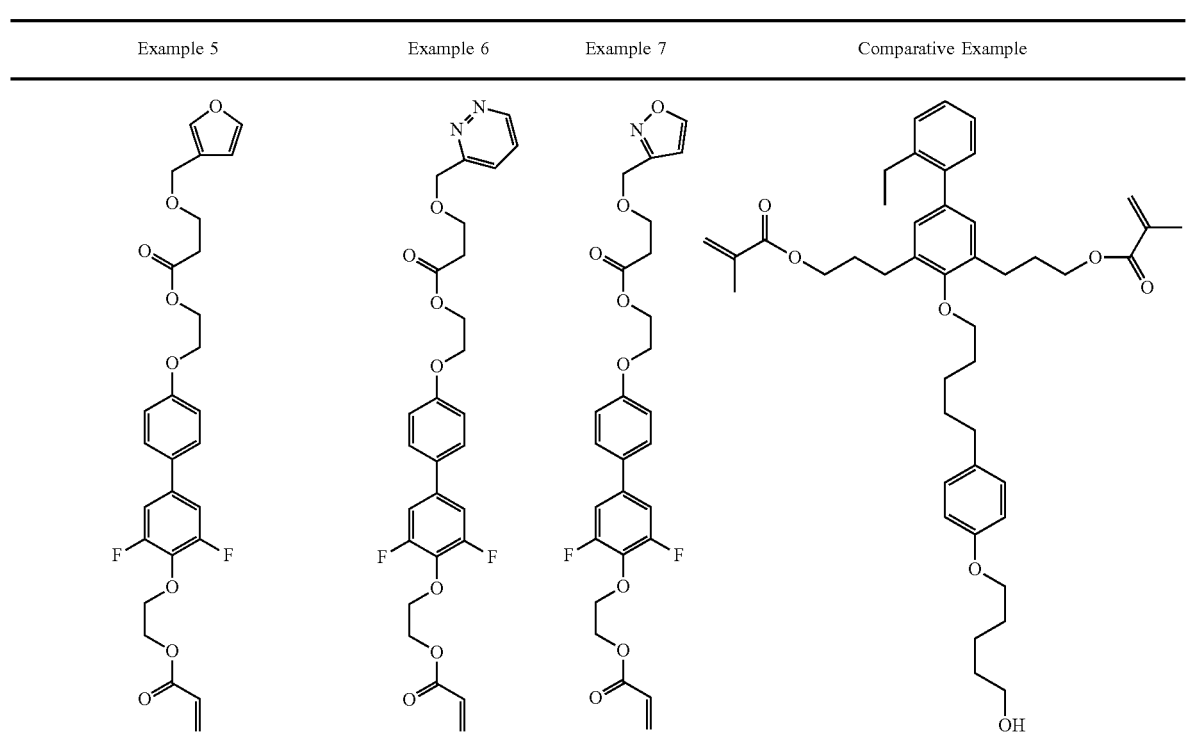

As described in Table 2, solubility and adsorption force of the first compound according to Examples 1 to 7 and the Comparative Example are described.

TABLE 2

| | Example 1 | Example 2 | Example 3 | Example 4 | Example 5 | Example 6 | Example 7 | Comparative Example |
|---|---|---|---|---|---|---|---|---|
| Solubility | 5.1 | 3.1 | 1.3 | 1.8 | 1.6 | 1.5 | 1.5 | 1.5 |
| Adsorption force | −1.27 | −1.34 | −0.99 | −0.40 | −0.45 | −0.51 | −0.53 | −0.49 |

Referring to Table 2, in the case of the first compound according to an example embodiment, it is confirmed that the solubility is the same level as or higher than the comparative example. Also, it may be confirmed that an absolute value of the adsorption force of the first compound is the same level as or higher than the comparative example. Accordingly, the first compound may be easily absorbed to the pixel electrode, thereby it may be confirmed that the solubility is excellent when being injected to the liquid crystal material and the first compound is easily injected along with the liquid crystal material.

By way of summation and review, a curved liquid crystal display may, for example, enhance the immersive experience of a viewer. In forming a curved liquid crystal display, two display panels may be misaligned from each other, which may reduce transmittance.

As described above, embodiments may provide a liquid crystal display with improved display quality by controlling transmittance deterioration due to a misalignment between a lower panel and an upper panel in a curved liquid crystal display and reducing a panel texture. A liquid crystal display according to an embodiment may control transmittance deterioration and texture generation due to a misalignment between the lower panel and the upper panel, thereby improving quality.

DESCRIPTION OF SYMBOLS

110: first substrate
210: second substrate
3: liquid crystal layer
31: liquid crystal molecule
13: protrusion Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise for example indicated. Accordingly, it will be understood by those of skill in the art that various changes in form and details may be made without departing from the spirit and scope of the present invention as set forth in the following claims.

What is claimed is:

1. A curved liquid crystal display, comprising:
a first substrate;
a second substrate overlapping the first substrate;
a liquid crystal layer positioned between the first substrate and the second substrate and including a plurality of liquid crystal molecules; and
a lower protrusion positioned between the first substrate and the liquid crystal layer, the lower protrusion being formed from a first compound represented by Chemical Formula 1A, a polymer obtained from the first compound, or a polymer of the first compound and a cross linker, P-E-F-G-Ra    [Chemical Formula 1A]

wherein, in Chemical Formula 1A,
P is

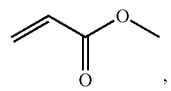

,

E is —$(CH_2)_n$—O— in which n is an integer of 1 to 12,
F is one or more of

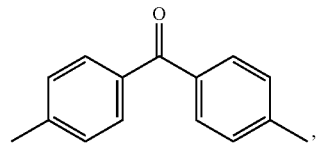

,

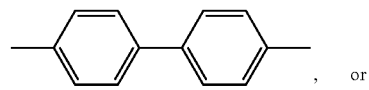

, or

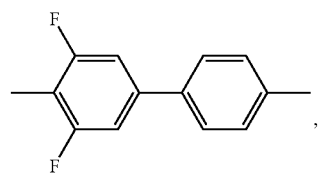

,

G is one or more of

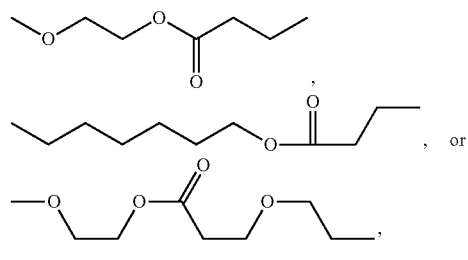

, and
Ra is one or more of

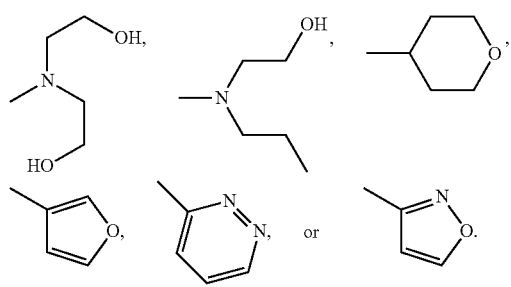

2. A curved liquid crystal display, comprising:

a first substrate;

a second substrate overlapping the first substrate;

a liquid crystal layer positioned between the first substrate and the second substrate and including a plurality of liquid crystal molecules; and a lower protrusion positioned between the first substrate and the liquid crystal layer, the lower protrusion being formed from a first compound including one or more compounds represented by Chemical Formulae 1-1 to 1-10, a polymer obtained from the first compound, or a polymer of the first compound and a cross linker,

[Chemical Formula 1-1]

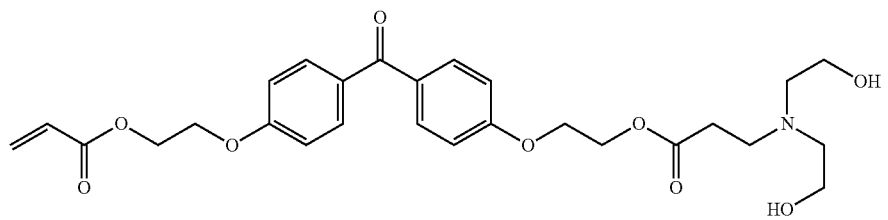

[Chemical Formula 1-2]

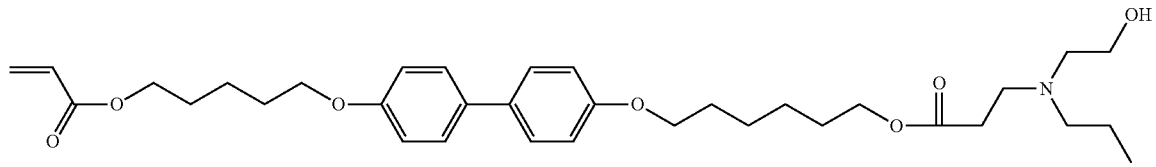

[Chemical Formula 1-3]

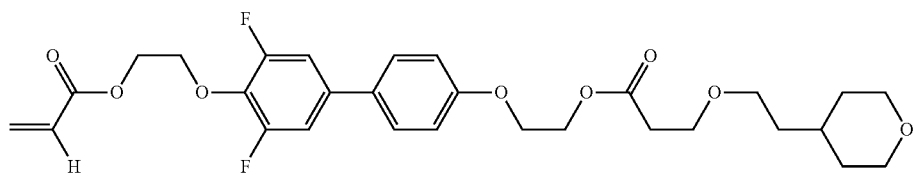

[Chemical Formula 1-4]

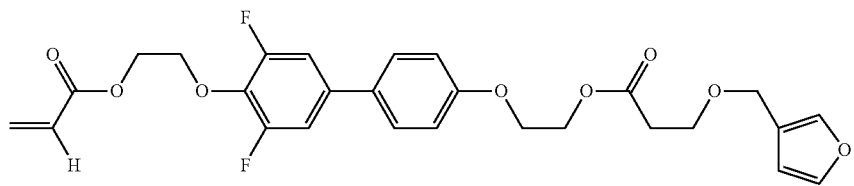

[Chemical Formula 1-5]

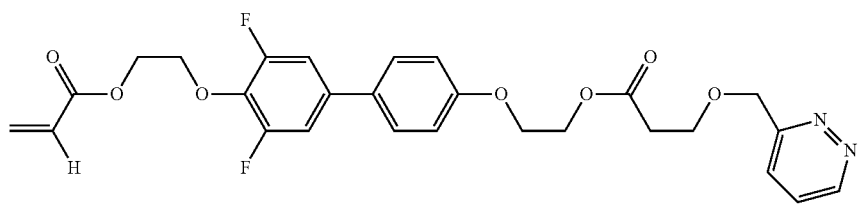

[Chemical Formula 1-6]

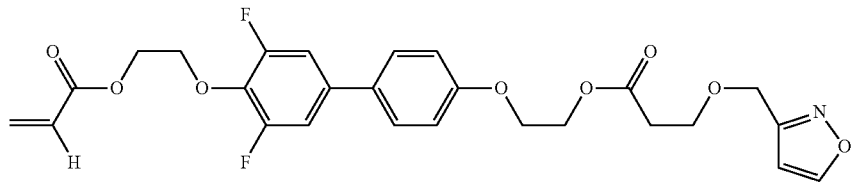

[Chemical Formula 1-7]

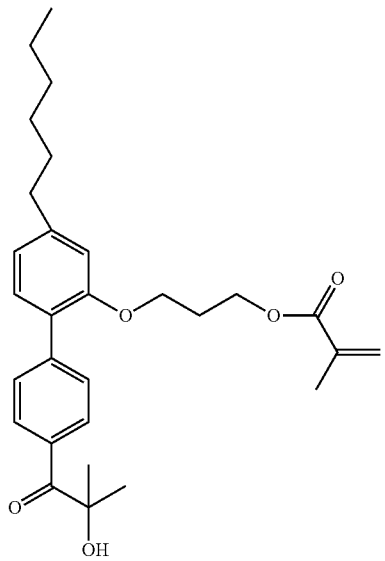

[Chemical Formula 1-8]

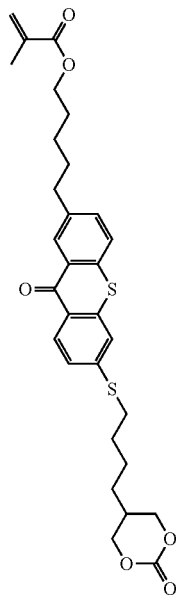

[Chemical Formula 1-9]

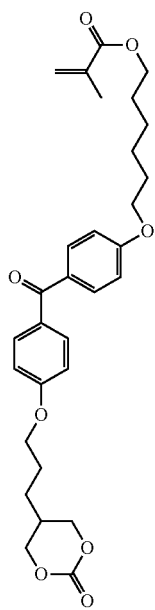

[Chemical Formula 1-10]

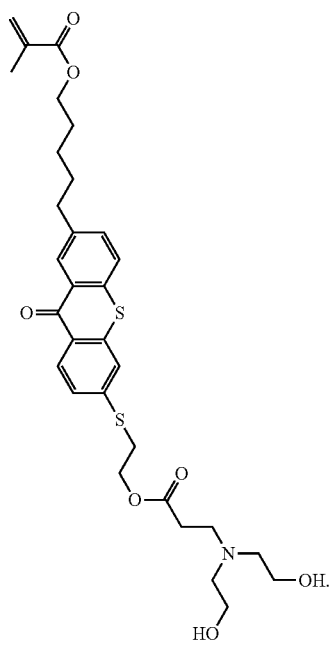

3. The curved liquid crystal display as claimed in claim 1, wherein the lower protrusion includes the polymer obtained from the first compound.

4. The curved liquid crystal display as claimed in claim 1, wherein the cross-linker includes one or more second compounds represented by Chemical Formulae 2-1 to 2-12:

[Chemical Formula 2-1]

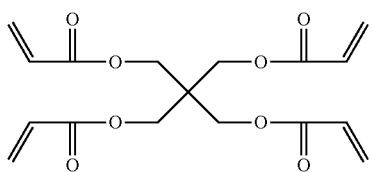

[Chemical Formula 2-2]

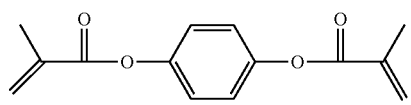

-continued
[Chemical Formula 2-3]
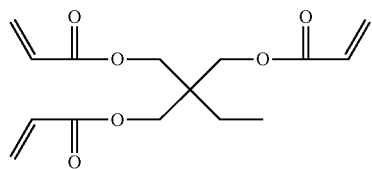
[Chemical Formula 2-4]
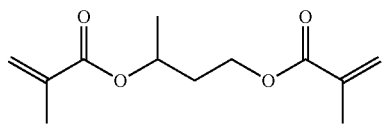
[Chemical Formula 2-5]
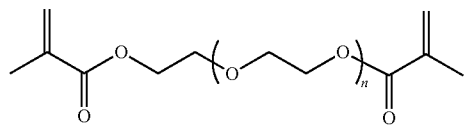
[Chemical Formula 2-6]
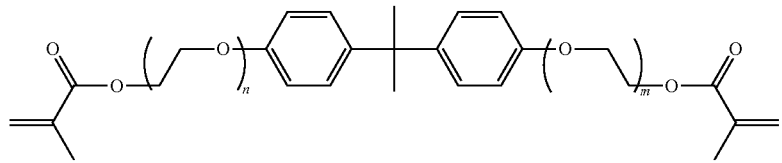
[Chemical Formula 2-7]
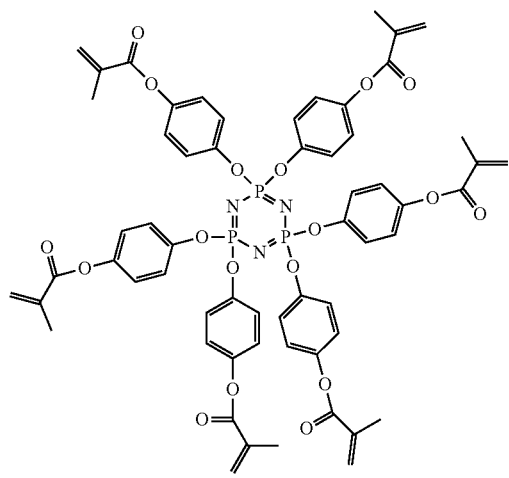
[Chemical Formula 2-8]
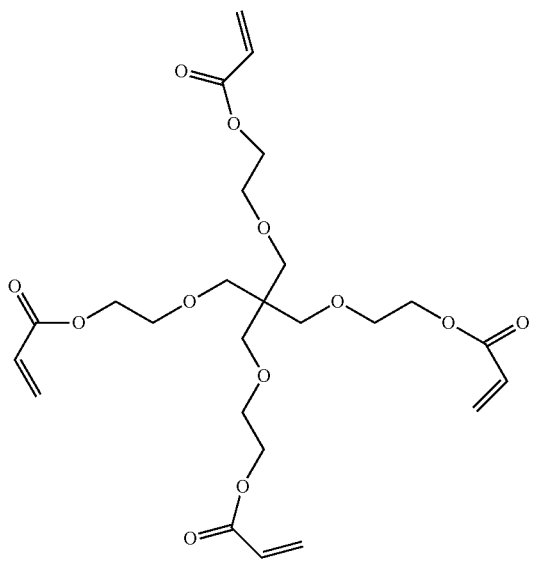
[Chemical Formula 2-9]
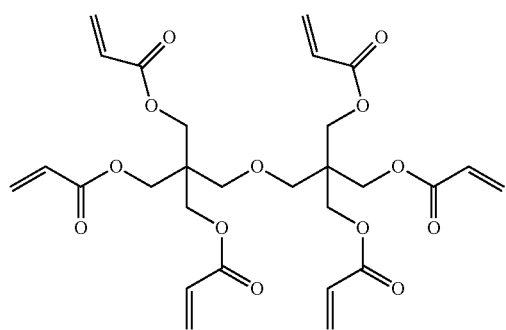
[Chemical Formula 2-10]
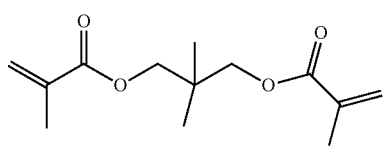

-continued

[Chemical Formula 2-11]

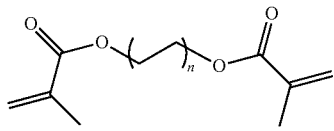

[Chemical Formula 2-12]

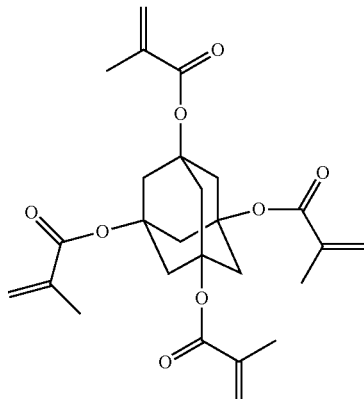

wherein, in Chemical Formulae 2-5, 2-6, and 2-11, n and m are independently integers of 1 to 12.

5. The curved liquid crystal display as claimed in claim 1, further comprising an upper protrusion positioned between the second substrate and the liquid crystal layer, the upper protrusion being formed from the first compound represented by Chemical Formula 1.

6. The curved liquid crystal display as claimed in claim 5, wherein a number of the lower protrusions is larger than a number of the upper protrusions.

7. The curved liquid crystal display as claimed in claim 1, further comprising:
a pixel electrode positioned between the first substrate and the liquid crystal layer; and
an upper alignment layer positioned between the second substrate and the liquid crystal layer, wherein:
an adsorption force of the first compound for the upper alignment layer is smaller than an adsorption force of the first compound for the pixel electrode.

8. The curved liquid crystal display as claimed in claim 1, further comprising:
a pixel electrode positioned between the first substrate and the liquid crystal layer; and
a lower alignment layer positioned between the pixel electrode and the liquid crystal layer, wherein:
the lower alignment layer further includes an initiator, and the initiator is bonded with the first compound.

9. The curved liquid crystal display as claimed in claim 1, wherein the liquid crystal layer does not include a reactive mesogen.

10. The curved liquid crystal display as claimed in claim 1, wherein liquid crystal molecules adjacent to the first substrate are inclined with respect to a direction perpendicular to a plane of the first substrate, and liquid crystal molecules adjacent to the second substrate are perpendicular to a plane of the second substrate.

11. The curved liquid crystal display as claimed in claim 1, wherein:
in the first compound represented by Chemical Formula 1A, Ra is an anchoring group, P is an immobilizing group, and a vertical alignment group is disposed between Ra and P, and the anchoring group is positioned adjacent to the first substrate.

* * * * *